United States Patent
Ide

(10) Patent No.: US 7,826,956 B2
(45) Date of Patent: Nov. 2, 2010

(54) CONTROL SYSTEM FOR PLANT

(75) Inventor: Hirohito Ide, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 206 days.

(21) Appl. No.: 12/219,044

(22) Filed: Jul. 15, 2008

(65) Prior Publication Data

US 2009/0037075 A1 Feb. 5, 2009

(30) Foreign Application Priority Data

Aug. 3, 2007 (JP) ............... 2007-202468
Feb. 21, 2008 (JP) ............... 2008-039491

(51) Int. Cl.
*F02D 31/00* (2006.01)
*G06F 19/00* (2006.01)

(52) U.S. Cl. ..................... 701/102; 123/376

(58) Field of Classification Search ............. 701/102, 701/85, 103; 123/337, 376, 398, 568.19, 123/399; 700/28–34, 37, 52

See application file for complete search history.

(56) References Cited

U.S. PATENT DOCUMENTS

| | | | |
|---|---|---|---|
| 6,266,580 B1 * | 7/2001 | Asahara et al. | 700/282 |
| 6,798,611 B1 * | 9/2004 | Romano et al. | 360/78.09 |
| 6,904,353 B1 * | 6/2005 | Kolavennu et al. | 701/102 |
| 2003/0028264 A1 | 2/2003 | Yasui et al. | |

FOREIGN PATENT DOCUMENTS

| | | |
|---|---|---|
| EP | 1 318 438 | 6/2003 |
| EP | 1 808 592 | 7/2007 |
| JP | 2003-015703 | 1/2003 |
| JP | 2003/172178 | 6/2003 |

OTHER PUBLICATIONS

Vadim I. Utkin, et al., Department of Electrical and Mechanical Engineering, "Sliding Modes Applications in Power Electronics and Motion Control Systems", 1999, pp. TU22-TU31, XP-011013967.
David Young, et al., "A Control Engineer'S Guide to Sliding Mode Control", IEEE Transactions on Control Systems Technology, vol. 7. No. 3. May 1999, pp. 328-342.
European Search Report, Issued on European Application No. EP 08 01 2541, Dated Sep. 15, 2008.

* cited by examiner

*Primary Examiner*—Mahmoud Gimie
(74) *Attorney, Agent, or Firm*—Squire, Sanders & Dempsey L.L.P.

(57) ABSTRACT

A control system for a plant, including a sliding mode controller and a transfer characteristic adjusting module. The sliding mode controller calculates a feedback control input with a sliding mode control so that an controlled output of the plant coincides with a target value. The transfer characteristic adjusting module is connected to an output of the sliding mode controller, and has a transfer characteristic set according to a transfer function of a controlled object model which is obtained by modeling the plant. A control input to the plant is set to an output of the transfer characteristic adjusting module. The transfer characteristic of the transfer characteristic adjusting module is set so that a composite transfer function indicative of a transfer characteristic which is obtained by combining the transfer characteristic of the transfer characteristic adjusting module and a transfer characteristic of the controlled object model, coincides with a desired target transfer function.

12 Claims, 16 Drawing Sheets

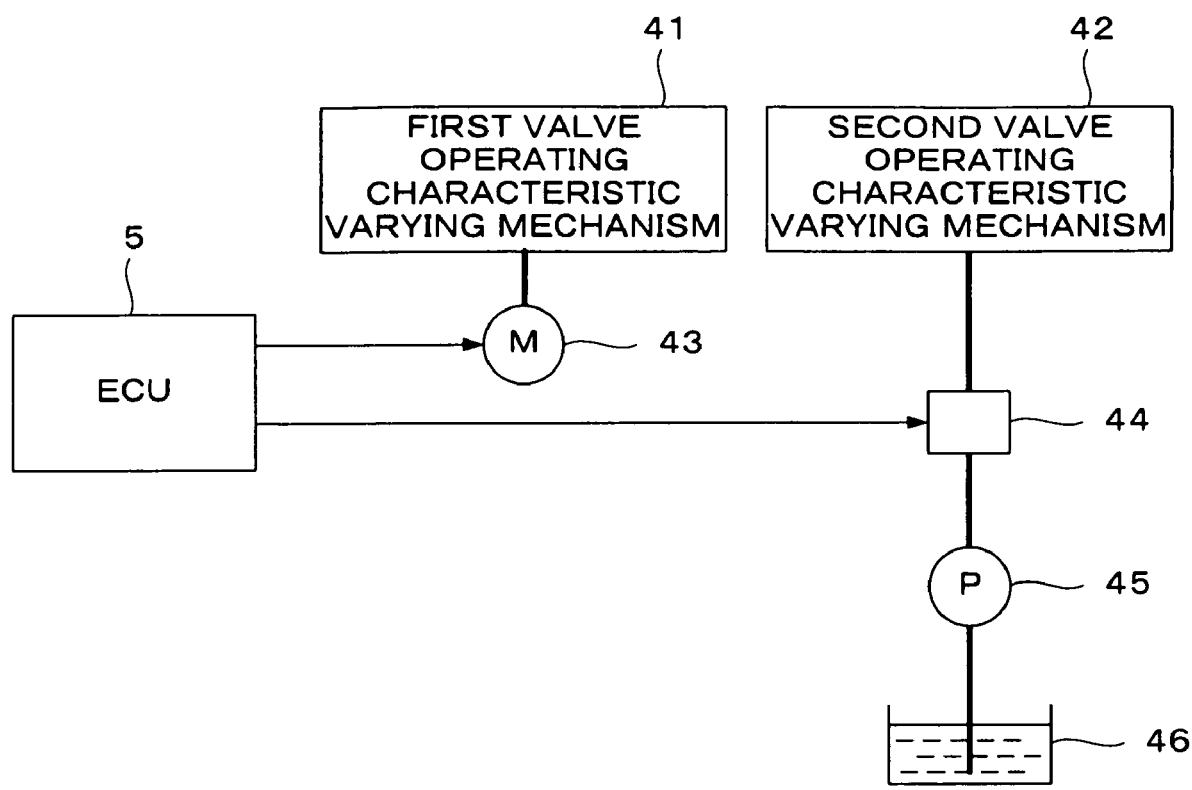

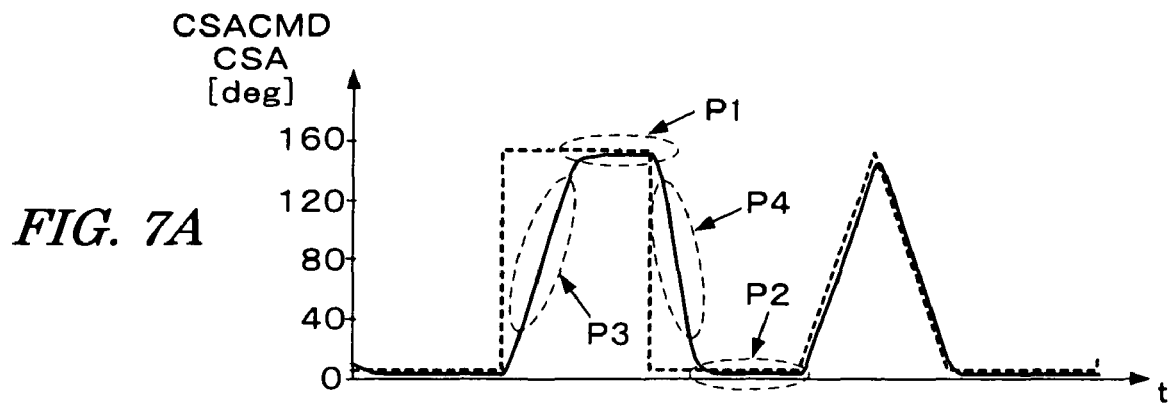
FIG. 7A
FIG. 7B
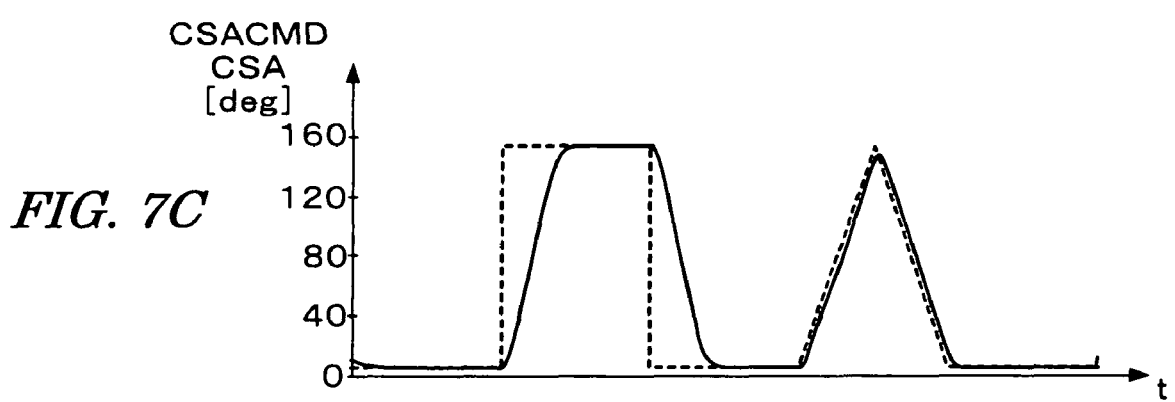
FIG. 7C
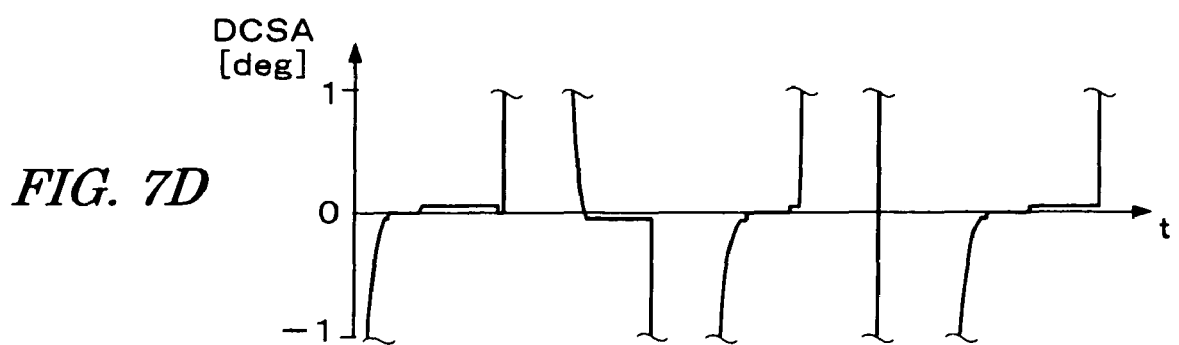
FIG. 7D

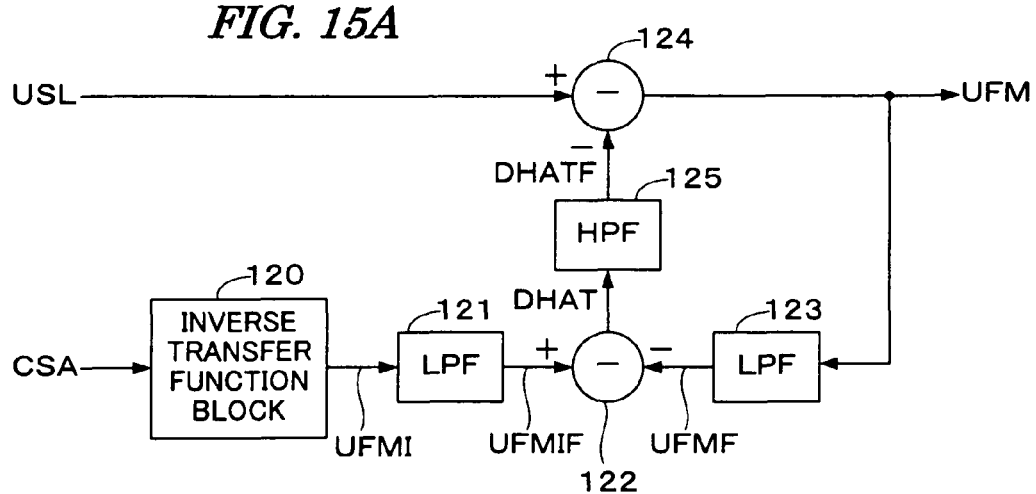
*FIG. 15A*
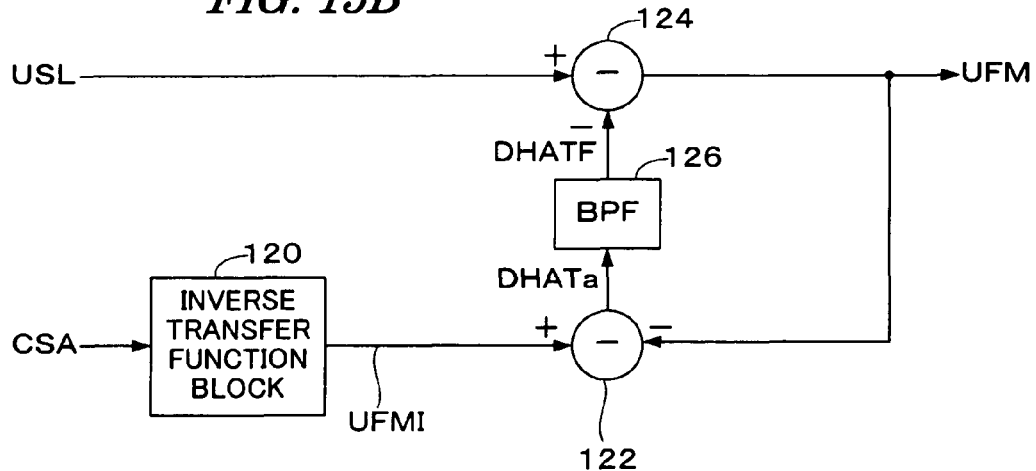
*FIG. 15B*
*FIG. 16*
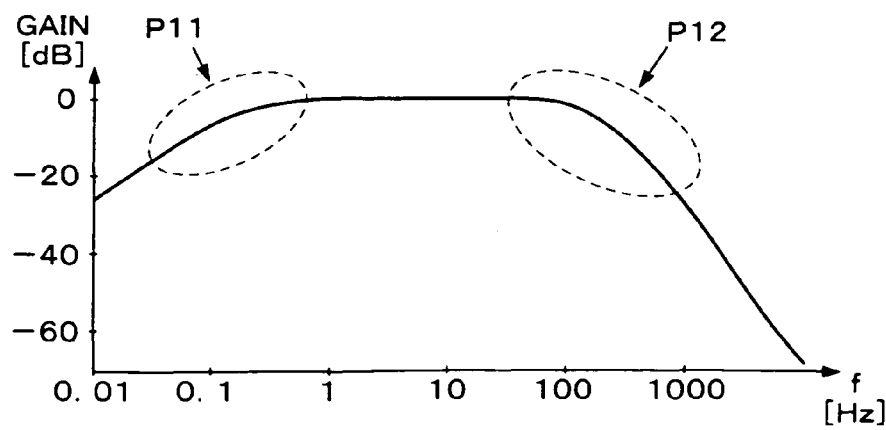

CONTROL SYSTEM FOR PLANT

BACKGROUND OF THE INVENTION

1. Field of the Invention

The present invention relates to a control system for a plant, and particularly to a control system that controls a plant with the sliding mode control so that a controlled output of the plant coincide with a target value.

2. Description of the Related Art

Japanese Patent Laid-open No. 2003-15703 (JP '703) discloses a control system which performs a feedback control with the sliding mode control. According to this control system, a feedback control is performed with the sliding mode control so that an opening of a throttle valve of an internal combustion engine coincides with a target opening, for example.

In the above conventional control system, a model parameter identifier is used in order to deal with a change in the dynamic characteristic of the controlled object, and model parameters of a controlled object model which is obtained by modeling the controlled object are identified in real-time processing.

However, if the change in the dynamic characteristic is comparatively large, disturbance applied to the controlled object is comparatively large, or the controlled object has nonlinear characteristics, a modeling error (a difference between the characteristic of an actual controlled object and the characteristic of the controlled object model) temporarily becomes large, and control stability may be reduced.

Further, in the above conventional system, a method in which influence of the disturbance is eliminated by one model parameter (c1) identified by the model parameter identifier, is adopted. Accordingly, there is a possibility that the control system can not sufficiently deal with the change in the dynamic characteristic of the controlled object.

SUMMARY OF THE INVENTION

The present invention was made contemplating the above-described points, and an object of the present invention is to provide a control system for a plant, which performs the sliding mode control with sufficient robustness and stability when the change in the dynamic characteristic of the controlled object is comparatively great, the disturbance is comparatively great, and/or the controlled object has nonlinear characteristics.

In one embodiment, the present invention provides an apparatus, including sliding mode control means and transfer characteristic adjusting means. The sliding mode control means calculates a feedback control input (USL) with a sliding mode control so that a controlled output (CSA) of the plant coincides with a target value (CSACMD). The transfer characteristic adjusting means is connected to an output of the sliding mode control means, and has a transfer characteristic set according to a transfer function (G(s)) of a controlled object model which is obtained by modeling the plant. A control input to the plant is set to an output (UFM) of the transfer characteristic adjusting means, and the transfer characteristic of the transfer characteristic adjusting means is set so that a composite transfer function (FX(s)) indicative of a transfer characteristic which is obtained by combining the transfer characteristic of the transfer characteristic adjusting means and a transfer characteristic of the controlled object model, coincides with a desired target transfer function (F(s)).

With this configuration, the transfer characteristic of the transfer characteristic adjusting means is set so that the composite transfer function indicative of the transfer characteristic which is obtained by combining the transfer characteristic of the transfer characteristic adjusting means and the transfer characteristic of the controlled object model, coincides with the desired target transfer function. Accordingly, by appropriately setting the target transfer function and controlling the extended controlled object having the transfer characteristic expressed by the target transfer function with the sliding mode control, the sliding mode control with sufficient robustness and stability can be performed even when such an error factor that the change in the dynamic characteristic of the controlled object is comparatively great, the disturbance is comparatively great, and/or the controlled object has nonlinear characteristics, exists.

Preferably, the transfer characteristic adjusting means includes a subtractor (102) and a frequency shaping controller (103). The subtractor (102) calculates a difference (DUSL) between the feedback control input (USL) and the controlled output (CSA) of the plant, and the frequency shaping controller (103) calculates the control input (UFM) to the plant by applying a frequency shaping transfer function (H(s)) to the calculated difference (DUSL).

With this configuration, the difference between the feedback control input calculated with the sliding mode control and the controlled output of the plant, is calculated, and the control input to the plant is calculated by applying the frequency shaping transfer function to the difference. Accordingly, an extended controlled object having a transfer characteristic expressed by the target transfer function becomes the controlled object of the sliding mode control, which makes it possible to always perform the sliding mode control with sufficient robustness and stability.

Preferably, the transfer characteristic adjusting means includes disturbance estimating means (120-123) for estimating a disturbance component (DHAT) applied to the plant according to the control input (UFM) to the plant and the controlled output (CSA) of the plant, and calculates the control input (UFM) to the plant by subtracting the disturbance component (DHAT) output from the disturbance estimating means (120-123), from the feedback control input (USL).

With this configuration, the disturbance component applied to the plant is estimated according to the control input to the plant and the controlled output of the plant, and the control input to the plant is calculated by subtracting the estimated disturbance component from the feedback control input. An extended controlled object having a transfer characteristic expressed by the target transfer function becomes the controlled object of the sliding mode control, which makes it possible to always perform the sliding mode control with sufficient robustness and stability.

Preferably, the transfer characteristic adjusting means includes a subtractor (102), a frequency shaping controller (103a), and disturbance estimating means (120-123). The subtractor (102) calculates a difference (DUSL) between the feedback control input (USL) and the controlled output (CSA) of the plant, and the frequency shaping controller (103a) calculates a frequency shaped output (UFS) by applying a frequency shaping transfer function (H(s)) to the calculated difference (DUSL). Further, the disturbance estimating means (120-123) estimates a disturbance component (DHAT) applied to the plant according to the control input (UFM) to the plant and the controlled output (CSA) of the plant, and the transfer characteristic adjusting means calculates the control input (UFM) to the plant by subtracting the disturbance component (DHAT) estimated by the disturbance estimating means (120-123) from the frequency shaped output (UFS).

With this configuration, the difference between the feedback control input and the controlled output of the plant is calculated, and the frequency shaped output is calculated by applying the frequency shaping transfer function to the calculated difference. The disturbance component applied to the plant is calculated according to the control input to the plant and the controlled output of the plant, and the control input to the plant is calculated by subtracting the estimated disturbance component from the frequency shaped output. According to the above-described calculation, the extended controlled object having a transfer characteristic expressed by the target transfer function becomes a controlled object of the sliding mode control, which makes it possible to always perform the sliding mode control with sufficient robustness and stability. Further, addition of the frequency shaping controller and the disturbance estimating means makes it possible to increase flexibility in designing the control system. For example, the response characteristic of the control can be adjusted with the calculation of the frequency shaped output, and robustness and stability of the control can be secured with subtraction of the disturbance component when there is an error factor.

Preferably, the disturbance estimating means includes filtering means for performing a band-pass filtering (121,123, 125;126) of the disturbance component (DHAT) estimated according to the control input (UFM) to the plant and the controlled output (CSA) of the plant, and outputs the disturbance component (DHATF) filtered by the filtering means (121,123,125;126).

With this configuration, the band-pass filtering of the estimated disturbance component is performed, and the filtered disturbance component is applied to the calculation of the control input. Noise components are removed by the band-pass filtering, which makes it possible to prevent a drawback such that the controlled output vibrates in a small amplitude.

In another embodiment, the invention can include an apparatus having a sliding mode controller which is configured to calculate a feedback control input with a sliding mode control so that a controlled object of a plant coincides with a target value. A transfer characteristic adjuster is connected to an output of the sliding mode controller, and has a transfer characteristic set according to a transfer function of a controlled object model which is obtained by modeling the plant. A control input to the plant is set to an output of the transfer characteristic adjuster. The transfer characteristic of the transfer characteristic adjuster can be set so that a composite transfer function indicative of a transfer characteristic which is obtained by combining the transfer characteristic of the transfer characteristic adjuster and a transfer characteristic of the controlled object model coincides with a desired transfer function.

In another embodiment, the invention can include a method which comprises calculating a feedback control input with a sliding mode control so that a controlled output of a plant coincides with a target value. The calculated feedback controlled input is inputted to a transfer characteristic adjusting module which has a transfer characteristic set according to a transfer function of a controlled object model which is obtained by modeling the plant. This embodiment of the invention can also include inputting the output of the transfer characteristic adjusting module as a control input to the plant. The transfer characteristic of the transfer characteristic adjusting module can be set so that a composite transfer function indicative of a transfer characteristic which is obtained by combining the transfer characteristic of the transfer characteristic adjusting module and a transferred characteristic of the controlled object model coincides with a desired target transfer function.

BRIEF DESCRIPTION OF THE DRAWINGS

FIG. 2 shows a configuration of a valve operating characteristic varying device shown in FIG. 1;

FIGS. 6A-8D are time charts showing examples of the control operation;

FIGS. 15A and 15B are block diagrams showing a configuration of the disturbance observer according to a fifth embodiment of the present invention;

FIG. 16 shows a gain frequency characteristic of the filter shown in FIG. 15;

DETAILED DESCRIPTION OF THE PREFERRED EMBODIMENTS

Preferred embodiments of the present invention will now be described with reference to the drawings.

First Embodiment

Figure 1:
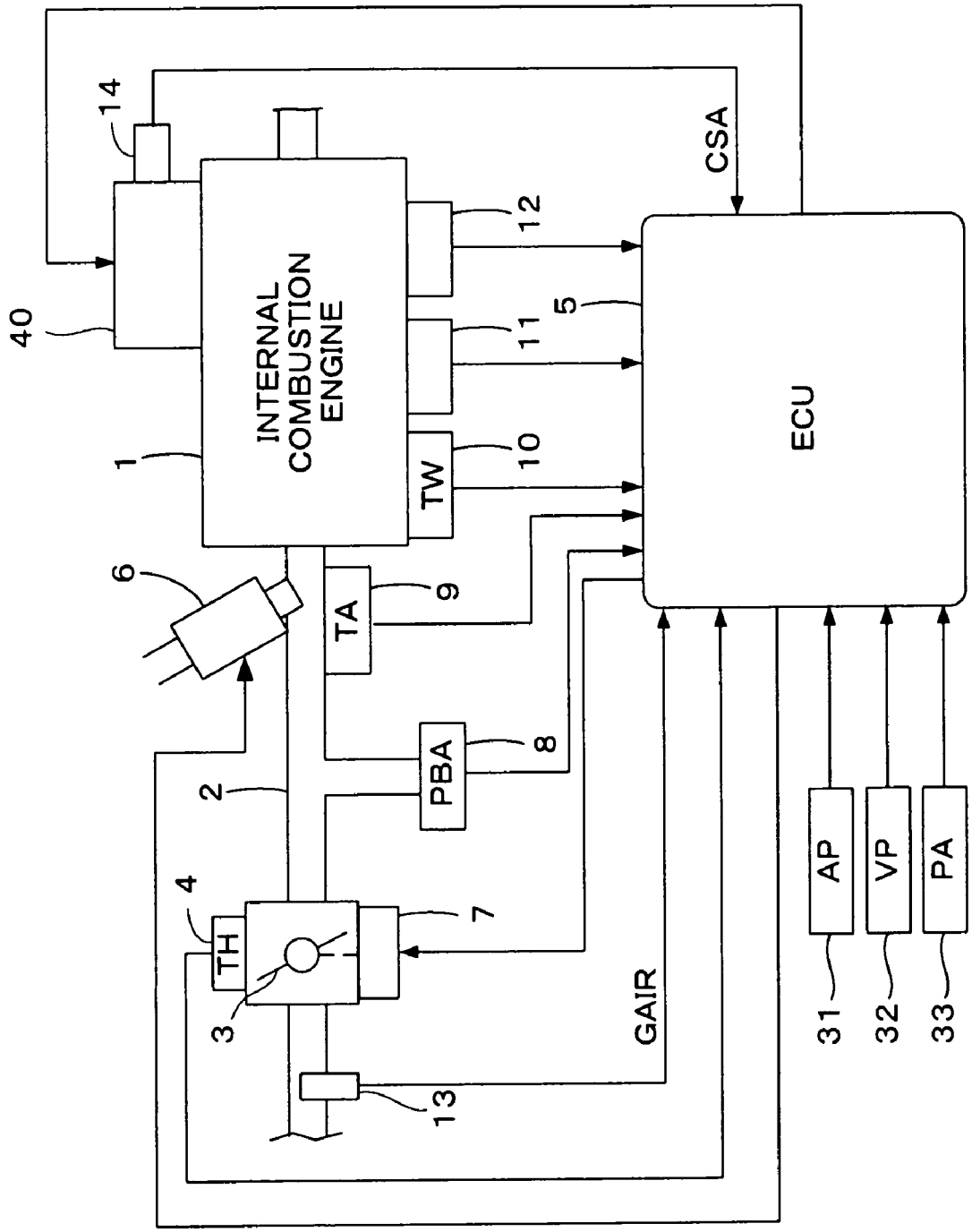
FIG. 1 shows a configuration of an internal combustion engine and a control system therefor according to a first embodiment of the present invention.

FIG. 1 is a schematic diagram showing a configuration of an internal combustion engine and a control system therefor according to a first embodiment of the present invention. FIG. 2 is a schematic diagram showing a configuration of a valve operating characteristic varying device.

Referring to FIG. 1, an internal combustion engine (hereinafter referred to as "engine") 1, having, for example, four cylinders can be provided with intake valves and exhaust valves, and cams for driving the intake valves and the exhaust valves. The engine 1 is provided with a valve operating characteristic varying device 40 having a first valve operating characteristic varying mechanism 41 and a second valve operating characteristic varying mechanism 42. The first valve operating characteristic varying mechanism 41 can continuously vary the valve lift amount and the opening angle or valve opening period of the intake valve. The second valve operating characteristic varying mechanism 42 is a cam phase varying mechanism for continuously varying the operating phases of the cams for driving the intake valves with reference to a rotational angle of the crank shaft of the engine 1. The second valve operating characteristic varying mechanism 42 can vary the operating phase of the cam for driving each intake valve, and consequently varies the operating phase of each intake valve.

The engine 1 has an intake pipe 2 provided with a throttle valve 3. A throttle valve opening (TH) sensor 4 is connected to the throttle valve 3 can output an electrical signal corresponding to an opening of the throttle valve 3, and can supply the electrical signal to an electronic control unit (referred to as "ECU") 5. An actuator 7 for actuating the throttle valve 3 is connected to the throttle valve 3, and the operation of the actuator 7 is controlled by the ECU 5.

Fuel injection valves 6 are inserted into the intake pipe 2 at locations between the cylinder block of the engine 1 and the throttle valve 3 and slightly upstream of the respective intake valves (not shown). The fuel injection valves 6 are connected to a fuel pump (not shown), and electrically connected to the ECU 5. A valve opening period of each fuel injection valve 6 is controlled by a signal output from the ECU 5.

An intake pressure sensor 8 for detecting an intake pressure PBA and an intake air temperature sensor 9 for detecting an intake air temperature TA can be disposed downstream of the throttle valve 3. Further, an engine coolant temperature sensor 10 for detecting an engine coolant temperature TW can be mounted on the body of the engine 1. The detection signals from these sensors are supplied to the ECU 5.

A crank angle position sensor 11 and a cam angle position sensor 12 are connected to the ECU 5. The crank angle position sensor 11 is provided to detect a rotational angle of the crankshaft (not shown) of the engine 1, and the cam angle position sensor 12 is provided to detect a rotational angle of a camshaft to which the cams for driving the intake valves of the engine 1 are fixed. A signal corresponding to the rotational angle detected by the crank angle sensor 11 and a signal corresponding to the rotational angle detected by the cam angle position sensor 12 can be supplied to the ECU 5. The crank angle position sensor 11 can generate one pulse (hereinafter referred to as "CRK pulse") at every constant crank angle period (e.g., a period of 30 degrees) and a pulse for specifying a predetermined angle position of the crankshaft. The cam angle position sensor 12 can generate a pulse at a predetermined crank angle position for a specific cylinder of the engine 1 (this pulse will be hereinafter referred to as "CYL pulse"). The cam angle position sensor 12 further generates a pulse at a top dead center (TDC) starting the intake stroke in each cylinder (this pulse will be hereinafter referred to as "TDC pulse"). These pulses are used for control of various timings such as a fuel injection timing and ignition timing, and for detection of an engine rotational speed NE. An actual operating phase CAIN of the crankshaft is detected from the correlation between the TDC pulse output from the cam angle position sensor 12 and the CRK pulse output from the crank angle position sensor 11.

An accelerator sensor 31, a vehicle speed sensor 32, and an atmospheric pressure sensor 33 can also be connected to the ECU 5. The accelerator sensor 31 detects a depression amount AP of an accelerator pedal of the vehicle driven by the engine 1 (this depression amount will be hereinafter referred to as "accelerator control input"). The vehicle speed sensor 32 can detect a running speed (vehicle speed) VP of the vehicle. The atmospheric pressure sensor 33 detects an atmospheric pressure PA. The detection signals from these sensors are supplied to the ECU 5.

The valve operating characteristic varying device 40, as shown in FIG. 2, includes a first valve operating characteristic varying mechanism 41, a second valve operating characteristic varying mechanism 42, a motor 43, and a solenoid valve 44. The first valve operating characteristic varying mechanism 41 continuously varies a lift amount and an opening angle (hereinafter referred to simply as "lift amount LFT") of each intake valve. The second valve operating characteristic varying mechanism 42 continuously varies an operating phase of each intake valve. The motor 43 is provided for continuously changing the lift amount LFT of each intake valve. An opening of the solenoid valve 44 is continuously variable for changing the operating phase of each intake valve. The operating phase CAIN of the camshaft is used as a parameter indicative of the operating phase of the intake valve. Lubricating oil contained in an oil pan 46 is pressurized by an oil pump 45, and supplied to the solenoid valve 44. It is to be noted that a specific configuration of the second valve operating characteristic varying mechanism 42 is described, for example, in Japanese Patent Laid-open No. 2000-227013.

Figure 3A:
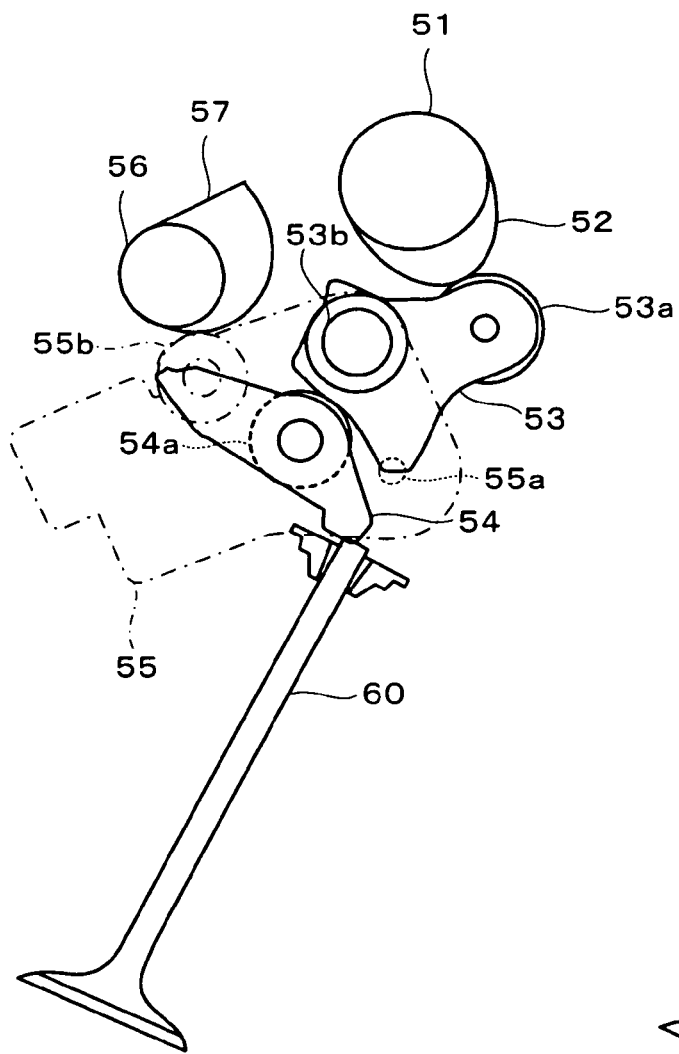
FIGS. 3A and 3B illustrate a simplified configuration of the first valve operating characteristic varying mechanism shown in FIG. 2.

As shown in FIG. 3A, the first valve operating characteristic varying mechanism 41 can include a camshaft 51, a control arm 55, a control shaft 56, a sub-cam 53, and a rocker arm 54. The camshaft 51 is provided with a cam 52. The control arm 55 is supported by the cylinder head so that the control arm 55 can pivot around a shaft 55a. The control shaft 56 is provided with a control cam 57 which pivots the control arm 55. The sub-cam 53 is supported by the control arm 55 through a supporting shaft 53b so that the sub-cam 53 can pivot around the supporting shaft 53b. The sub-cam 53 is actuated by the cam 52. The rocker arm 54 is actuated by the sub-cam 53 and opens and closes an intake valve 60. The rocker arm 54 is supported in the control arm 55 so that the rocker arm 54 can pivot.

The sub-cam 53 has a roller 53a abutting the cam 52, and can pivot around the shaft 53b by rotation of the camshaft 51. The rocker arm 54 has a roller 54a abutting the sub-cam 53. The movement of the sub-cam 53 is transmitted to the rocker arm 54 through the roller 54a.

Figure 3B:
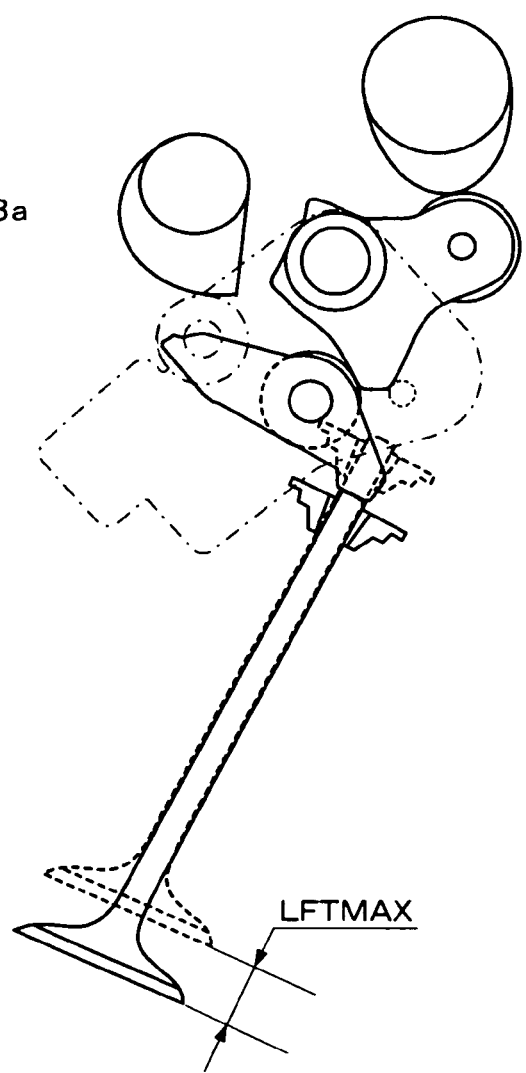

The control arm 55 has a roller 55b abutting the control cam 57, and pivots around the shaft 55a by rotation of the control shaft 56. In the state shown in FIG. 3A, the intake valve 60 maintains a substantially fully-closed state, since the movement of the sub-cam 53 is not substantially transmitted to the rocker arm 54. On the other hand, in the state shown in FIG. 3B, the movement of the sub-cam 53 is transmitted to the intake valve 60 through the rocker arm 54, and the intake valve 60 opens to a maximum lift amount LFTMAX (e.g., 12 mm).

Therefore, the lift amount LFT of the intake valve 60 can be continuously varied by pivoting the control shaft 56 with the motor 43. In this embodiment, the first valve operating characteristic varying mechanism 41 includes a control shaft rotational angle sensor 14 for detecting a rotational angle (hereinafter referred to as "CS angle") CSA of the control shaft 56. The detected CS angle CSA is used as a parameter indicative of the lift amount LFT.

It is to be noted that the detailed configuration of the first valve operating characteristic varying mechanism 41 is described, for example, in Japanese Patent Laid-open No.

2008-25418 by Honda Motor Co. Ltd, the contents of which are hereby incorporated by reference.

Figure 4A:
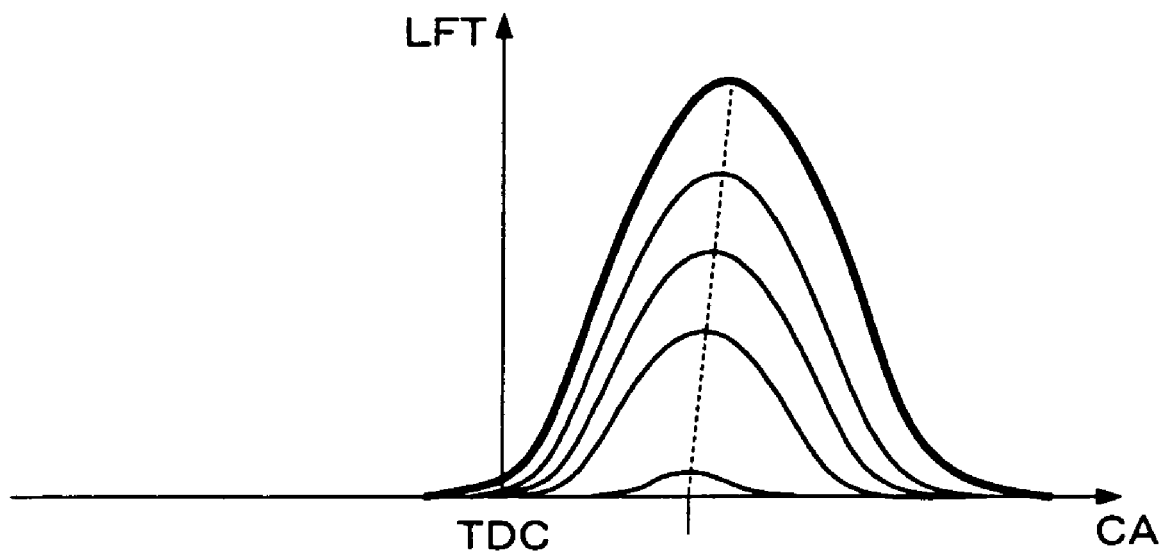
FIGS. 4A and 4B show valve operating characteristics of an intake valve.
Figure 4B:
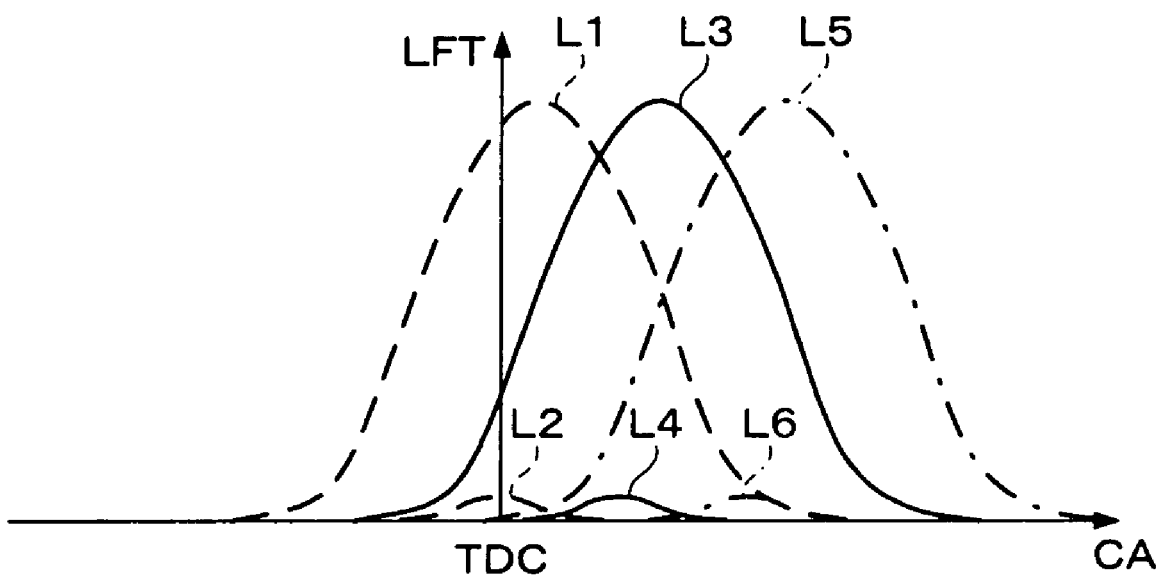

According to an embodiment of the first valve operating characteristic varying mechanism 41, as shown in FIG. 4A, the lift amount LFT (and the opening angle) of the intake valve is varied. Further, according to an embodiment of the second valve operating characteristic varying mechanism 42, the intake valve is driven with a phase from the most advanced phase, shown by the broken lines L1 and L2 in FIG. 4B to the most retarded phase, shown by the dot-and-dash lines L5 and L6 in FIG. 4B, depending on a change in the operating phase CAIN of the camshaft. In FIG. 4B, the characteristics shown by the solid lines L3 and L4 are the center of the variable phase range.

The ECU 5 includes an input circuit having various functions including a function of shaping the waveforms of input signals from the various sensors, a function of correcting the voltage levels of the input signals to a predetermined level, and a function of converting analog signal values into digital signal values. The ECU 5 further includes a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the actuator 7, the fuel injection valves 6, the motor 43, and the solenoid valve 44.

The CPU in the ECU 5 can control an opening of the throttle valve 3, controls an amount of fuel to be supplied to the engine 1 (the opening period of each fuel injection valve 6), and the valve operating characteristic (intake air flow rate) through the motor 43 and the solenoid valve 44 according to the detected signals from the above-described sensors.

In the lift amount control (CS angle control) of the intake valve, a lift amount command value LFTCMD of the intake valve is calculated according to an engine operating condition, and a CS angle command value CSACMD is calculated according to the lift amount command value LFTCMD. Further, a feedback control of a drive current IMD of the motor 43 is performed so that the detected CS angle CSA coincides with the CS angle command value CSACMD.

Figure 5:
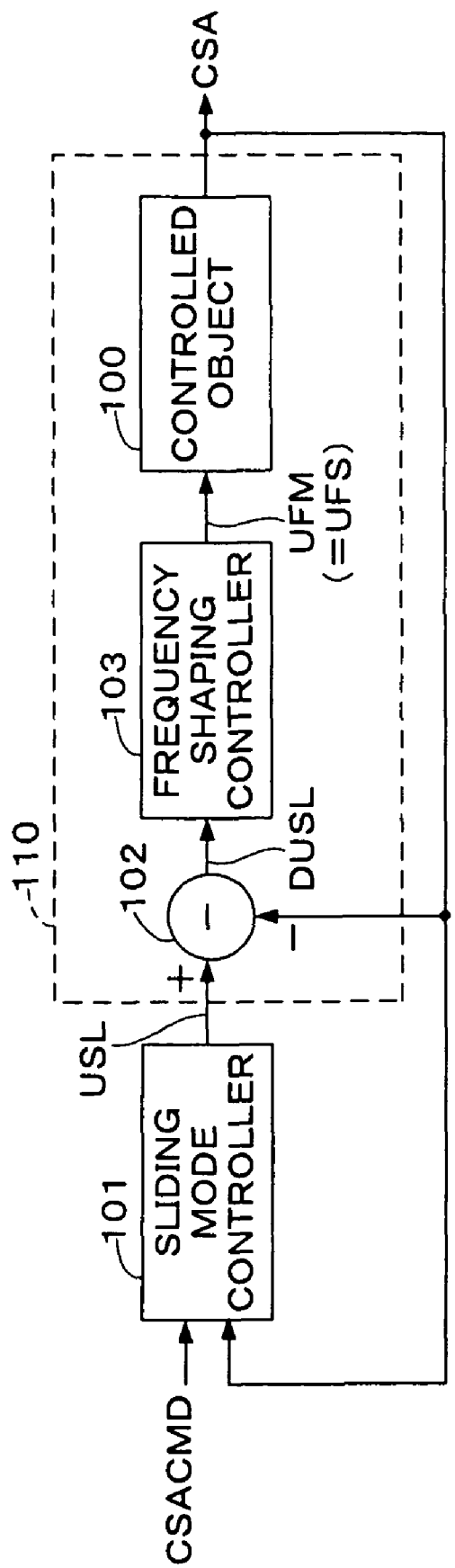
FIG. 5 is a block diagram showing a configuration of a control system according to the first embodiment.

FIG. 5 is a block diagram showing a configuration of a control system in this embodiment. The control system shown in FIG. 5 can include a sliding mode controller 101, a subtractor 102, a frequency shaping controller 103, and a controlled object 100. The controlled object 100 can include a conversion block, a motor 43, and the first valve operating characteristic varying mechanism 41. The conversion block converts a control input, which is output from the frequency shaping controller 103, to a motor drive current IMD.

The sliding mode controller 101 calculates a feedback control input USL using a sliding mode control method so that the actual CS angle CSA coincides with a CS angle command value CSACMD. It is to be noted that, in this embodiment, the feedback control input USL is calculated as a value of the dimension which is the same as that of the CS angle CSA.

The subtractor 102 subtracts the CS angle CSA from the feedback control input USL to calculate a control input deviation DUSL. The frequency shaping controller 103 applies a frequency shaping transfer function to the control input deviation DUSL, to calculate a final control input UFM. It is to be noted that the output of the frequency shaping controller 103 is also referred to as "frequency shaping control input UFS". The motor drive current IMD is set so as to be proportional to the final control input UFM.

In this embodiment, a block, which can include of the subtractor 102, the frequency shaping controller 103, and the controlled object 100, is defined as an extended controlled object 110. A frequency shaping transfer function H(s), which is a transfer function of the frequency shaping controller 103, can be set so that a transfer function FX(s) of the extended controlled object 110 coincides with a desired target transfer function F(s).

If the transfer function of the controlled object 100 (hereinafter referred to as "object transfer function") is expressed with "G(s)", the transfer function FX(s) of the extended controlled object 110 is given by the following equation (1).

$$FX(s) = \frac{G(s) \cdot H(s)}{1 + G(s) \cdot H(s)} \quad (1)$$

The frequency shaping transfer function H(s), which makes the transfer function FX(s) equal to the target transfer function F(s), is obtained as the following equation (2) by replacing FX(s) in the equation (1) with F(s) and solving the modified equation with respect to H(s).

$$H(s) = \frac{F(s)}{1 - F(s)} \cdot \frac{1}{G(s)} \quad (2)$$

Next, an example of how the target transfer function F(s) is set will be described. The object transfer function G(s), which is a transfer function of the first valve operating characteristic varying mechanism 41 (more properly, a transfer function of a controlled object model obtained by modeling the first valve operating characteristic varying mechanism 41) can be expressed with the following equation (3). In the equation (3), "J", "B", and "K" are constants determined by the characteristics of the motor 43 and the first valve operating characteristic varying mechanism 41, for example, a motor torque constant, a gear reduction ratio, an inertia moment of the motor 43, an inertia moment of the control shaft 56, and the like.

$$G(s) = \frac{1}{J \cdot s^2 + B \cdot s + K} \quad (3)$$

In order to obtain the extended controlled object 110 expressed by the similar transfer function even if there exist error factors such as a change in the dynamic characteristic of the controlled object and/or a great disturbance, the target transfer function F(s) is given, for example, by the following equation (4). Then, the frequency shaping transfer function H(s) is given by the following equation (5).

$$F(s) = \frac{1}{a \cdot s^2 + b \cdot s + c} \quad (4)$$

$$H(s) = \frac{J \cdot s^2 + B \cdot s + K}{a \cdot s^2 + b \cdot s + c - 1} \quad (5)$$

The transfer function H(s) of a continuous time system can be converted by the well-known method to a transfer function H(z) of a discrete time system expressed by the following equation (6). In the equation (6), "a1", "a2", "b0", "b1", and "b2" are constants calculated with the well-known method using constants "J", "B", "K", "a", "b", and "c" which are contained in the equation (5) and a control period "T" (the method for converting the continuous time system model to the discrete time system model).

$$H(z) = \frac{b0 \cdot z^2 + b1 \cdot z + b2}{z^2 - a1 \cdot z - a2} \quad (6)$$

The following equation (7) for calculating the final control input UFM(k) is obtained from the frequency shaping transfer function expressed by the equation (6).

$$UFM(k) = a1 \times UFM(k-1) + a2 \times UFM(k-2) + \quad (7)$$
$$b0 \times DUSL(k) + b1 \times DUSL(k-1) + b2 \times DUSL(k-2)$$

The calculation method of the feedback control input USL in the sliding mode controller 101 will be described. The feedback control input USL can be calculated by the following equation (21) as a sum of an equivalent control input UEQ and a reaching law control input URCH.

$$USL(k) = UEQ(k) + URCH(k) \quad (21)$$

The transfer function of the extended controlled object 110 is F(s). By converting the transfer function F(s) to a transfer function of the discrete time system and expressing the CS angle CSA(k), which is a controlled output, with the feedback control input USL and the past values of the CS angle CSA, the following equation (22) which defines the controlled object model can be obtained.

$$CSA(k) = a11 \times CSA(k-1) + \quad (22)$$
$$a12 \times CSA(k-2) + b11 \times USL(k-1) + b12 \times USL(k-2)$$

In the equation (22), the model parameters a11, a12, b11, and b12 are model parameters of the discrete time system model, and are calculated with the well-known method using the model parameters a, b, and c of the continuous time system model and the control period T.

The switching function value σ (k) is defined by the following equation (27) using a control deviation DCSA calculated by the equation (26).

$$DCSA(k) = CSACMD(k) - CSA(k) \quad (26)$$

$$\sigma(k) = DCSA(k) + VPOLE \times DCSA(k-1) \quad (27)$$

In the equation (27), "VPOLE" is a switching function setting parameter which determines the damping characteristic of the control deviation DCSA, and is set to a value greater than "−1" and less than "0".

The equivalent control input UEQ is a control input which satisfies the following equation (28).

$$\sigma(k) = \sigma(k+1) \quad (28)$$

By applying the equations (22), (26), and (27) to the equation (28), the equivalent control input UEQ can be calculated by the following equation (29).

$$UEQ(k) = \quad (29)$$
$$(1/b11)\{(1-a11-VPOLE)CSA(k) + (VPOLE-a12)CSA(k-1) -$$
$$b12 \times USL(k-1) + CSACMD(k+1) +$$
$$(VPOLE-1)CSACMD(k) - VPOLE \times CSACMD(k-1)\}$$

The reaching law control input URCH is calculated by the following equation (30).

$$URCH(k) = (-F/b11)\sigma(k) \quad (30)$$

where "F" is a reaching law control gain.

By configuring the control system as described above, influence of the error factors such as a change in the dynamic characteristic of the controlled object 100, a large disturbance, or nonlinear elements in the control system, can be removed with the feedback control performed by the subtractor 102 and the frequency shaping controller 103, even if there exists any of such error factors in the control system. Consequently, stable control with the sliding mode controller 101 can be performed.

FIGS. 6A-8D show time charts for illustrating examples of the control operation. In FIGS. 6A-8D, the dashed lines indicate changes in the CS angle command value CSACMD, and the solid lines indicate changes in the CS angle CSA.

Figure 6A:
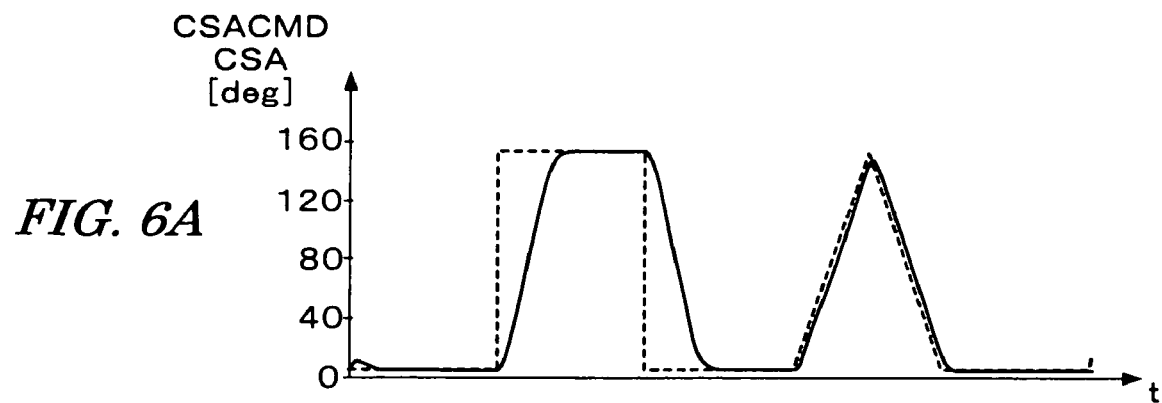
Figure 6B:
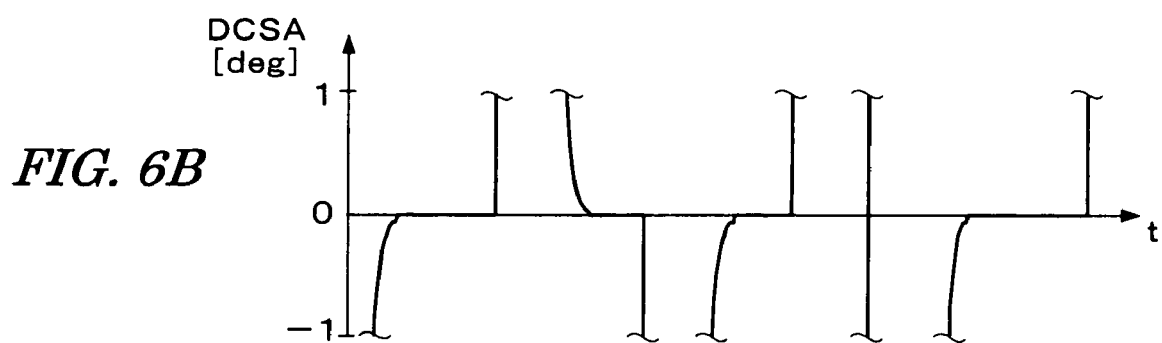
Figure 6C:
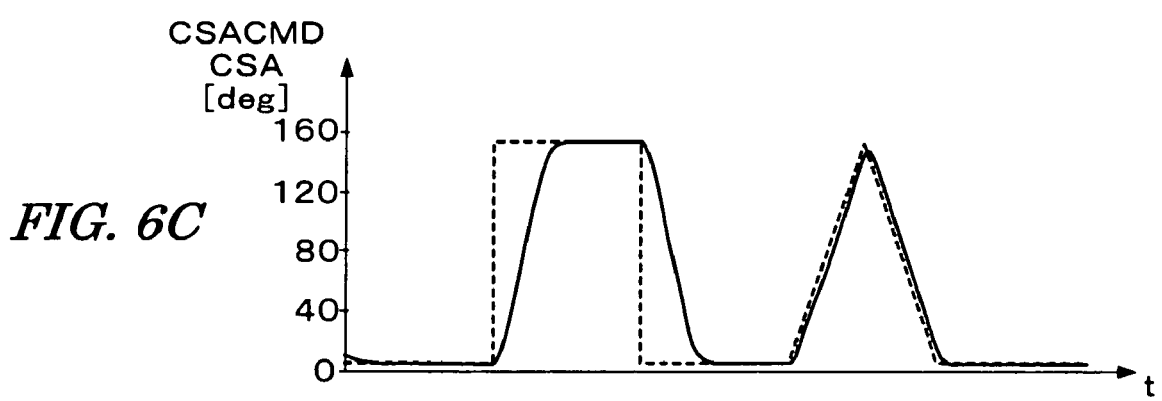
Figure 6D:
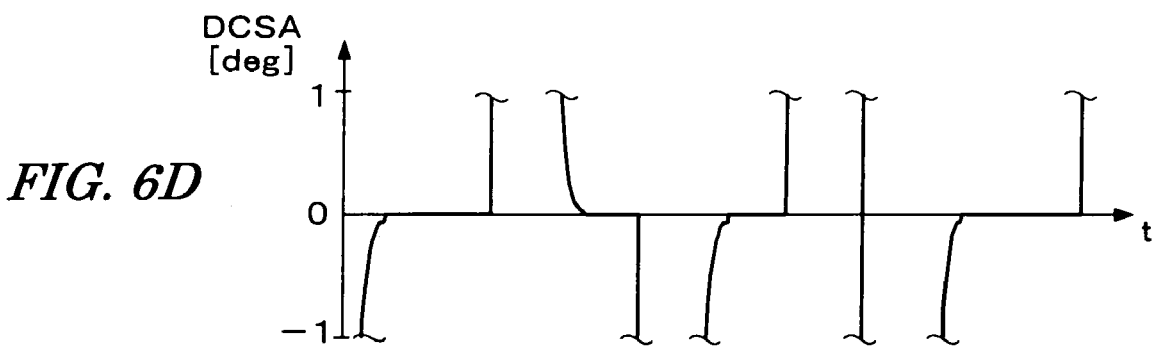

FIGS. 6A-6D correspond to a case where no error factor such as a dynamic characteristic change, a disturbance, or a nonlinear element exists. FIG. 6A corresponds to a control system (hereinafter referred to as "conventional control system"), which is configured so that the output of the sliding mode controller 101 is input directly to the controlled object 100, by deleting the subtractor 102 and the frequency shaping controller 103 from the configuration shown in FIG. 5. FIG. 6B shows magnified changes in the control deviation DCSA in the example shown in FIG. 6A. FIGS. 6C and 6D respectively correspond to FIGS. 6A and 6B, and show the response characteristic of the control system shown in FIG. 5. As apparent from FIGS. 6A-6D, there is no difference between the response characteristic of the conventional control system and the response characteristic of the control system in this embodiment if there is no error factor.

FIGS. 7A-7D show an example of the control operation wherein an error factor exists (for example, a torque due to the disturbance is applied to the control shaft, the torque constant changes, or the like). FIGS. 7A and 7B correspond to the conventional control system, and FIGS. 7C and 7D correspond to the control system shown in FIG. 5. In the regions P1 and P2 shown in FIG. 7A, the steady state error does not converge to "0". Further, an undershoot has occurred in the region P2. Furthermore, there is a difference between the inclination of the region P3 and the inclination (absolute value) of the region P4. On the other hand, in the control system of this embodiment, such problems do not occur at all as shown in FIG. 7C. That is, the response characteristic which is the same as that shown in FIG. 6C corresponding to a response characteristic with no error factor, can be realized.

Figure 8A:
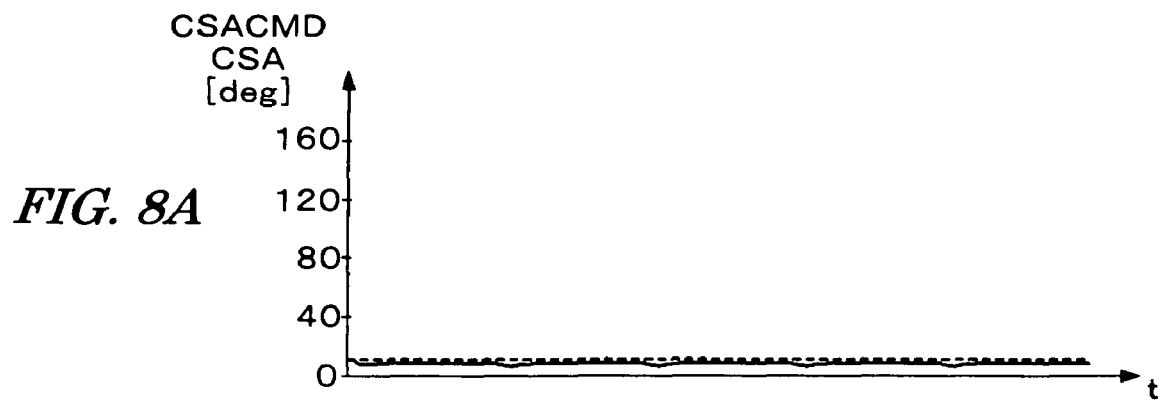
Figure 8B:
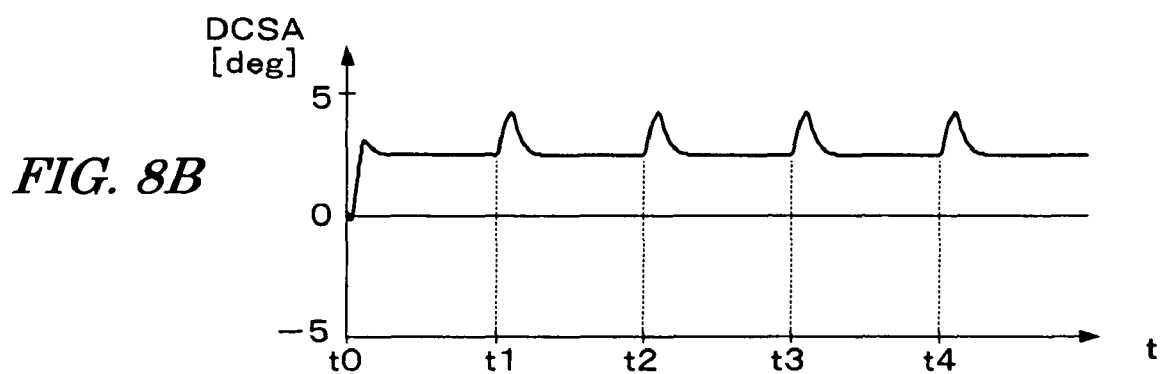
Figure 8C:
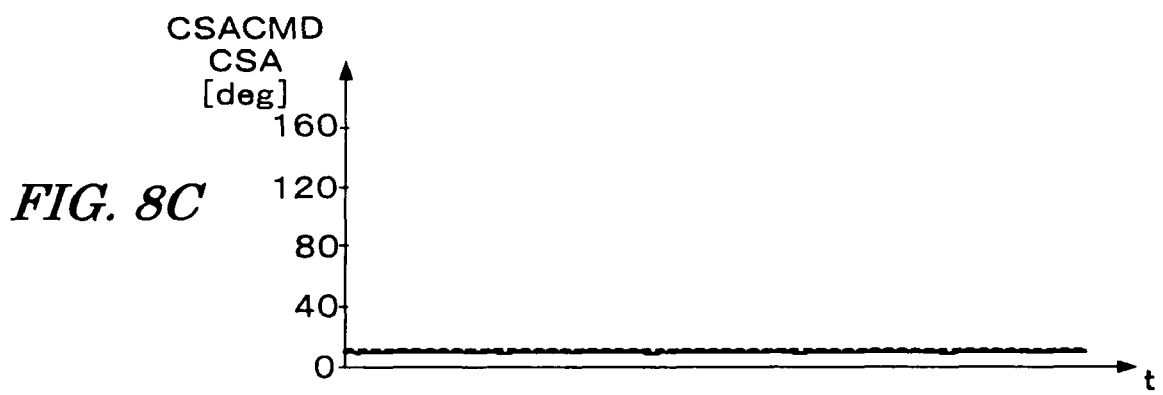
Figure 8D:

FIGS. 8A-8D show an example of the control operation wherein a disturbance is applied stepwise from time t0 to t4. FIGS. 8A and 8B correspond to the conventional control system. In FIGS. 8A and 8B, the disturbance is not eliminated, and the fact that the steady state error does not converge to "0" is shown (it should be noted that the vertical axis of FIG. 8B is expanded by 5 times). On the other hand, FIGS. 8C and 8D correspond to the control system in this embodiment. From these figures, it is confirmed that the control deviation DCSA is suppressed from −0.5 to +0.8 degree, and the influence of the disturbance is substantially eliminated.

In this embodiment, the sliding mode controller 101 corresponds to the sliding mode control means. The subtractor 102 and the frequency shaping controller 103 correspond to the transfer characteristic adjusting means.

Second Embodiment

Figure 9:
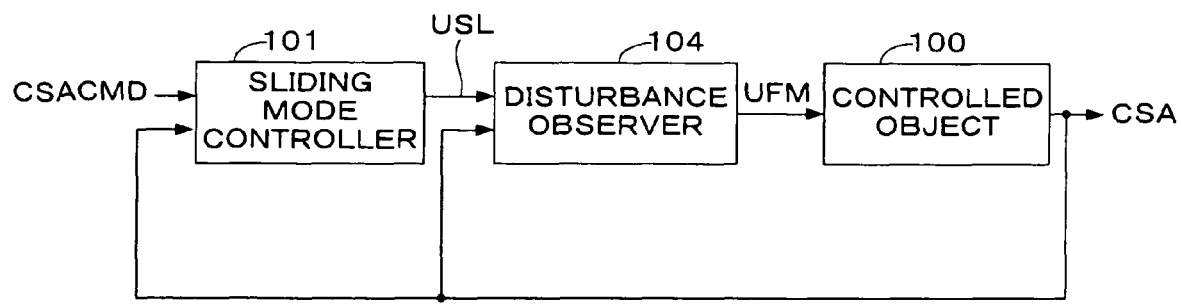
FIG. 9 is a block diagram showing a configuration of a control system according to a second embodiment of the present invention.

FIG. 9 is a block diagram showing a configuration of a control system according to a second embodiment of the present invention. The control system shown in FIG. 9 is obtained by deleting the subtractor 102 and the frequency shaping controller 103 of the control system shown in FIG. 5, and adding a disturbance observer 104. The sliding mode controller 101 and the controlled object 100 are the same as those in the first embodiment.

Figure 10:
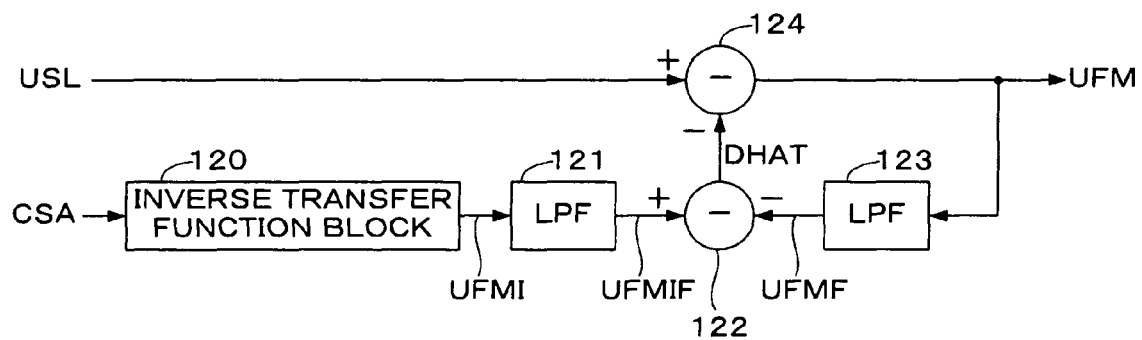
FIG. 10 is a block diagram showing a configuration of the disturbance observer in FIG. 9.
Figure 11A:
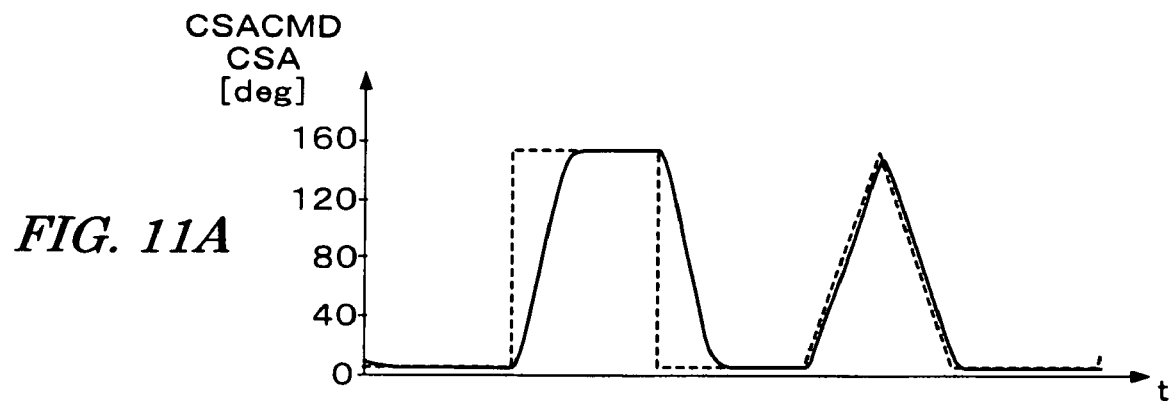
FIGS. 11A-11D are time charts showing an example of the control operation.
Figure 11B:
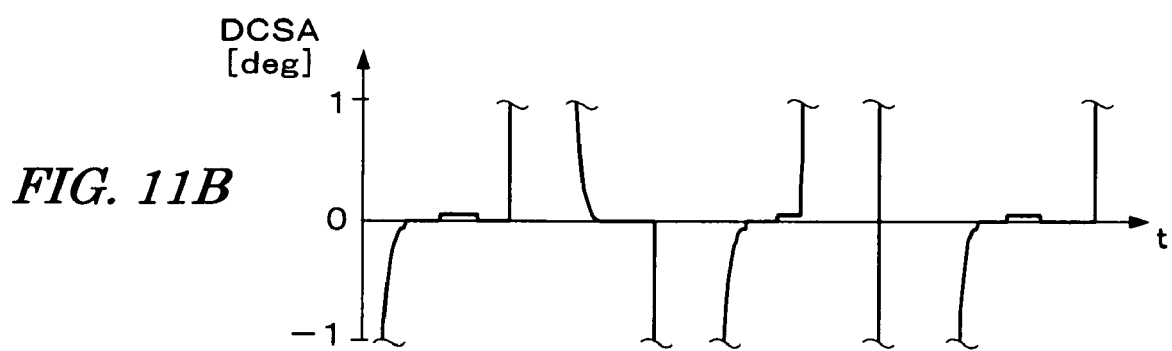
Figure 11C:
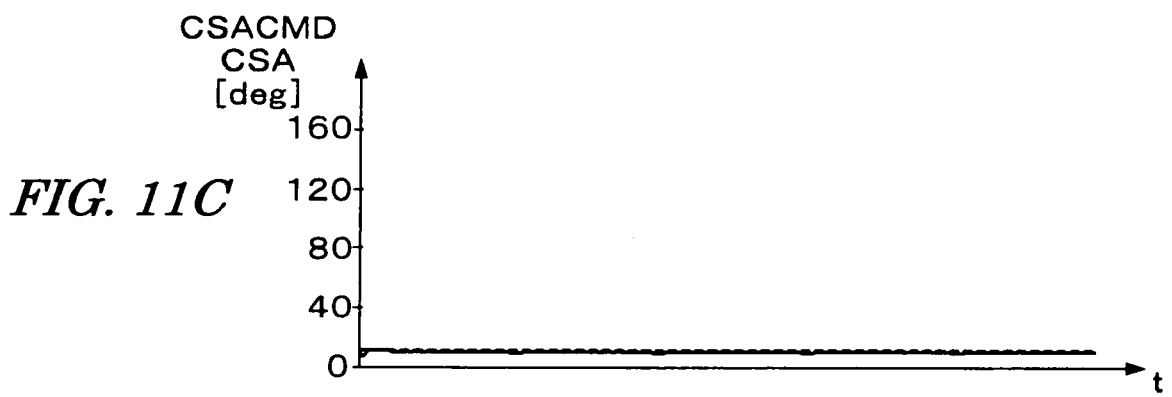
Figure 11D:
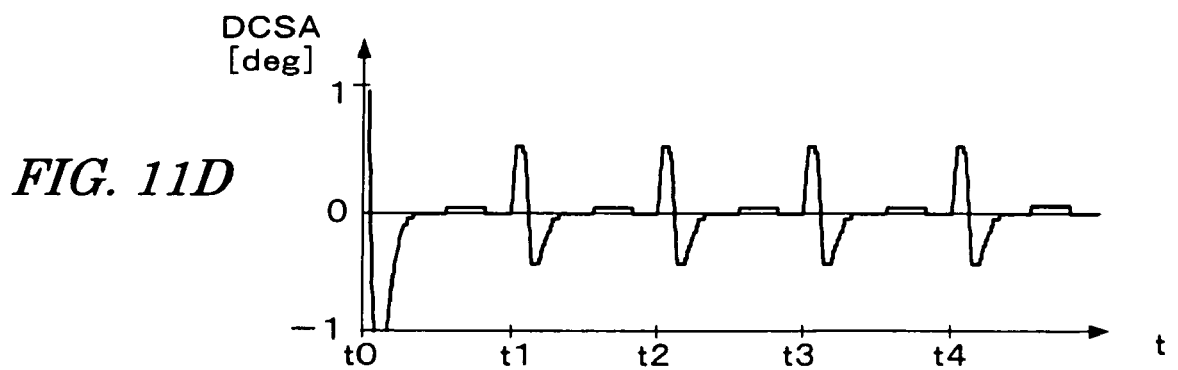

The disturbance observer 104, as shown in FIG. 10, can include a inverse transfer function block 120, low-pass filters (hereinafter referred to as "LPF") 121 and 123, and subtractors 122 and 124.

The inverse transfer function block 120 can perform a calculation which corresponds to an inverse transfer function $F^{-1}(s)$ of the target transfer function F(s) with respect to the CS angle CSA, to calculate a converted control input UFMI. A first LPF121 eliminates high-frequency components in the converted control input UFMI, and outputs a filtered converted control input UFMIF. A second LPF123, having the completely identical characteristic with that of the first LPF121, eliminates the high-frequency components in the final control input UFM, and outputs a filtered final control input UFMF.

The first subtractor 122 subtracts the filtered final control input UFMF from the filtered converted control input UFMIF, to calculate a disturbance estimated value DHAT (=UFMIF−UFMF). The second subtractor 124 subtracts the disturbance estimated value DHAT from the feedback control input USL, to calculate the final control input UFM.

In the control system shown in FIG. 9, a composite transfer function which is obtained by combining a transfer function of the disturbance observer 104 and a transfer function G(s) of the controlled object 100 becomes the target transfer function F(s). This point will be described below.

If a disturbance D is added to the final control input UFM, the CS angle CSA, which is a control output, is calculated by the following equation (41).

$$CSA = G(s) \times (UFM+D) \quad (41)$$

The disturbance estimated value DHAT can be expressed with the following equation (42). A frequency band in which the controlled object is controlled is a pass band of LPFs 121 and 123. Accordingly, the following description is made with setting the transfer function of LPFs 121 and 123 to "1".

$$DHAT = F^{-1}(s) \times CSA - UFM \quad (42)$$

The final control input UFM can be expressed with the following equation (43) which is obtained by transforming the equation (41).

$$UFM = G^{-1}(s) \times CSA - D \quad (43)$$

By applying the equation (43) to the equation (42), the following equation (44) can be obtained.

$$DHAT = F^{-1}(s) \times CSA - (G^{-1}(s) \times CSA - D) \quad (44)$$
$$= (F^{-1}(s) \times CSA - G^{-1}(s))CSA + D$$

On the other hand, the final control input UFM can be expressed with the following equation (45). Accordingly, the equation (41) can be transformed to the following equation (41a).

$$UFM = USL - DHAT \quad (45)$$

$$CSA = G(s) \times (USL - DHAT + D) \quad (41a)$$

By applying the equation (44) to the equation (41a), the following equation (46) is obtained.

$$CSA = G(s) \times \{USL - (F^{-1}(s) - (G^{-1}(s))CSA\} \quad (46)$$

By multiplying $G^{-1}(s)$ to both sides of the equation (46), the following equation (47) is obtained, and the equation (48) is obtained by transforming the equation (47).

$$G^{-1}(s) \times CSA = USL - (F^{-1}(s) - G^{-1}(s))CSA \quad (47)$$

$$CSA = F(s) \times USL \quad (48)$$

Next, the characteristic (transfer function Q(s)) of LPFs 121 and 123 is determined, to obtain the equation for calculating the final control input UFM.

The inverse transfer function $F^{-1}(s)$ of the target transfer function F(s) is expressed with the following equation (49). Accordingly, the inverse transfer function block 120 is an unstable controller.

$$F^{-1}(s) = a \times s^2 + b \times s + c \quad (49)$$

Therefore, it is necessary to set the transfer function Q(s) of LPFs 121 and 123 to a transfer function in which a degree of the dominator is higher than the degree of $F^{-1}(s)$. Accordingly, the transfer function Q(s) is set as the following equation (50), for example.

$$Q(s) = \left(\frac{1}{\tau s + 1}\right)^3 \quad (50)$$
$$= \frac{1}{\tau^3 s^3 + 3\tau^2 s^2 + 3\tau s + 1}$$

where τ is a constant.

A transfer function QFI(s), which is obtained by combining the transfer function Q(s) and the inverse transfer function $F^{-1}(s)$, is given by the following equation (51).

$$QFI(s) = \left(\frac{1}{\tau s + 1}\right)^3 (as^2 + bs + c) \quad (51)$$
$$= \frac{as^2 + bs + c}{\tau^3 s^3 + 3\tau^2 s^2 + 3\tau s + 1}$$

Further, by converting the transfer functions Q(s) and QFI(s) to transfer functions of the discrete time system, the following equations (52) and (53) are obtained. The coefficients a21 to a23, b20 to b23, p1 to p3, and q0 to q3 can be calculated by a well-known method using the coefficients contained in the transfer functions Q(s) and QFI(s) and the control period T.

$$Q(z) = \frac{q0 \cdot z^3 + q1 \cdot z^2 + q2 \cdot z + q3}{z^3 - p1 \cdot z^2 - p2 \cdot z - p3} \quad (52)$$

$$QFI(z) = \frac{b20 \cdot z^3 + b21 \cdot z^2 + b22 \cdot z + b23}{z^3 - a21 \cdot z^2 - a22 \cdot z - a23} \quad (53)$$

Therefore, the filtered final control input UFMF and the filtered converted control input UFMIF are respectively calculated by the following equation (54) and (55). It is to be noted that the equation (54) can correspond to the control system wherein a delay block is inserted on the input side of the second LPF 123. The delay block can delay the final control input UFM by one control period T. The delay block can be inserted in order to calculate the filtered final control input UFMF without using a future value of the final control input UFM.

$$UFMF(k) = p1 \times UFMF(k-1) + p2 \times UFMF(k-2) + \\ p3 \times UFMF(k-3) + q0 \times UFM(k-1) + \\ q1 \times UFM(k-2) + q2 \times UFM(k-3) + q3 \times UFM(k-4) \quad (54)$$

$$UFMIF(k) = a21 \times UFMIF(k-1) + \\ a22 \times UFMIF(k-2) + a23 \times UFMIF(k-3) + b20 \times CSA(k) + \\ b21 \times CSA(k-1) + b22 \times CSA(k-2) + b23 \times CSA(k-3) \quad (55)$$

The disturbance estimated value DHAT(k) is calculated by applying the above-described equations (54) and (55) to the following equation (56). The final control input UFM(k) is calculated by applying the disturbance estimated value DHAT(k) to the following equation (57).

$$DHAT(k)=UFMIF(k)-UFMF(k) \quad (56)$$

$$UFM(k)=USL(k)-DHAT(k) \quad (57)$$

By using the disturbance observer 104 described above, influence of error factors such as a disturbance or the like can be reduced or eliminated like the control system using the frequency shaping controller 103. Consequently, it is possible to consistently perform stable control with the sliding mode controller 101.

FIGS. 11A-11D show time charts illustrating examples of the control operation in the control system of this embodiment. The examples of the operation shown in FIGS. 11A-11D correspond to the example shown in FIGS. 7A-7D wherein an error factor exists in the control system. It is confirmed from FIGS. 11A-11D that a good response characteristic is also obtained in this embodiment compared with the response characteristics of the conventional control system shown in FIGS. 7A, 7B, 8A, and 8B.

In this embodiment, the disturbance observer 104 corresponds to the transfer characteristic adjusting means, and the inverse transfer function block 120, the LPF 121, the LPF 123, and the subtractor 122 constitute the disturbance estimating means.

Third Embodiment

Figure 12:
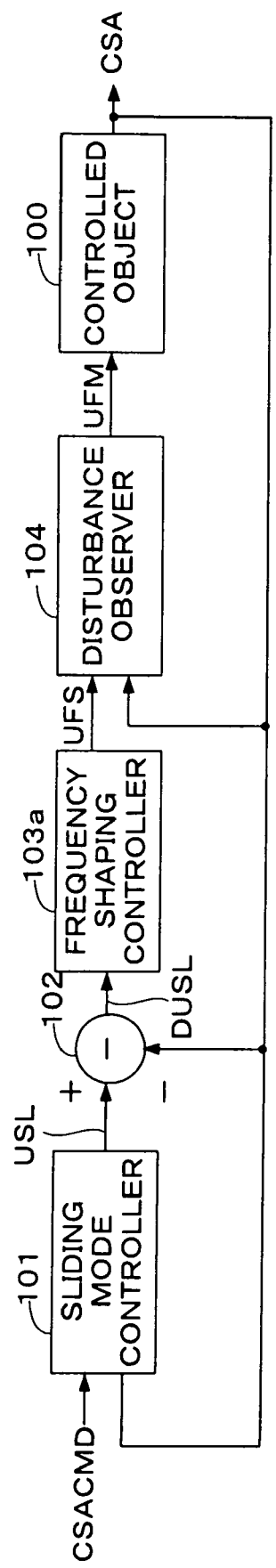
FIG. 12 is a block diagram showing a configuration of a control system according to a third embodiment of the present invention.
Figure 13A:
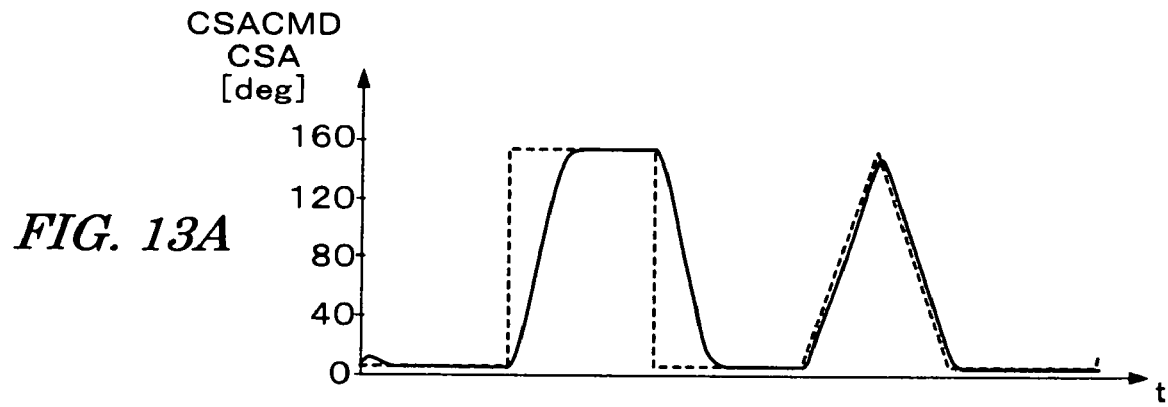
FIGS. 13A-13D are time charts showing an example of the control operation.
Figure 13B:
Figure 13C:
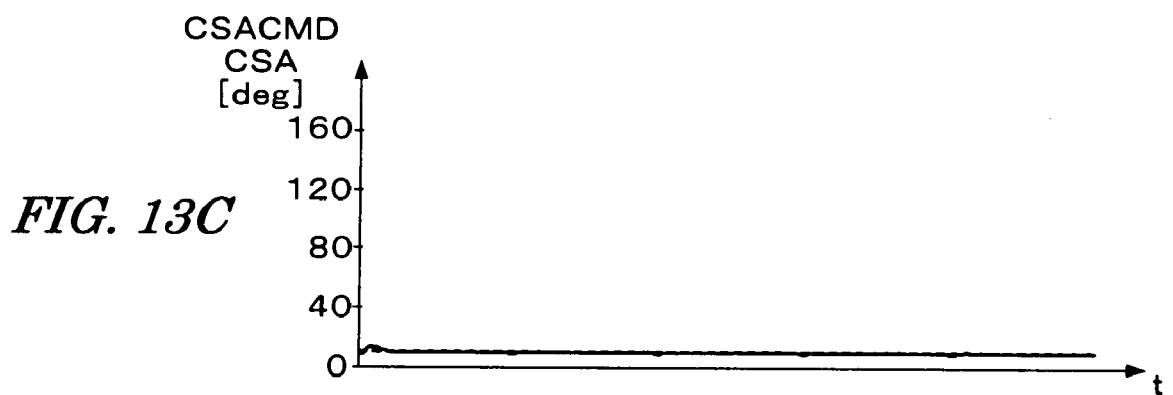
Figure 13D:
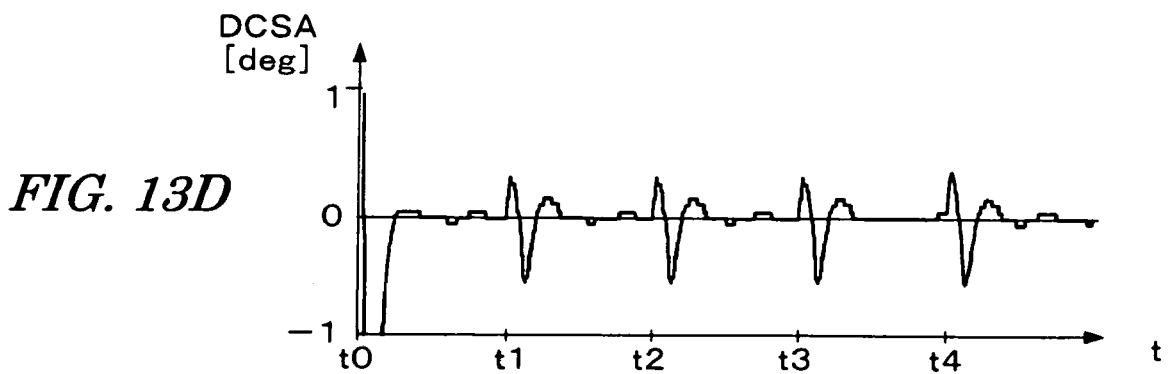

FIG. 12 is a block diagram showing a configuration of a control system in this embodiment. The control system shown in FIG. 12 is configured by inserting a subtractor 102, a frequency shaping controller 103a, and a disturbance observer 104 between the sliding mode controller 101 and the controlled object 100. The sliding mode controller 101 and the controlled object 100 are the same as those of the first embodiment.

The disturbance observer 104 is configured as shown in FIG. 10 similarly to the second embodiment. It is to be noted that the input parameter of the disturbance observer 104 is changed from the feedback control input USL in the second embodiment to the frequency shaping control input UFS.

The frequency shaping controller 103a can be configured similarly to the first embodiment by replacing the transfer function G(s) of the controlled object 100 in the first embodiment with the target transfer function F(s) (the composite transfer function of the disturbance observer 104 and the controlled object 100). In this case, the target transfer function may be the same as the target transfer function F(s), or can also be a second target transfer function F2(s).

Therefore, according to this embodiment, it is possible to increase flexibility in designing the control system. For example, the first target transfer function F(s) can be set so as to obtain good performance of suppressing disturbance, and the second target transfer function F2(s) can be set so as to obtain good response characteristic.

FIGS. 13A-13D show time charts illustrating examples of the control operation in the control system of this embodiment. The examples shown in FIGS. 13A-13D correspond to a case where an error factor exists in the control system, like the example shown in FIG. 7. It is confirmed that good control performance is obtained also in this embodiment, compared with the performance of the conventional control system shown in FIGS. 7A, 7B, 8A, and 8B.

In this embodiment, the subtractor 102, the frequency shaping controller 103a, and the disturbance observer 104 correspond to the transfer characteristic adjusting means.

Fourth Embodiment

Figure 14:
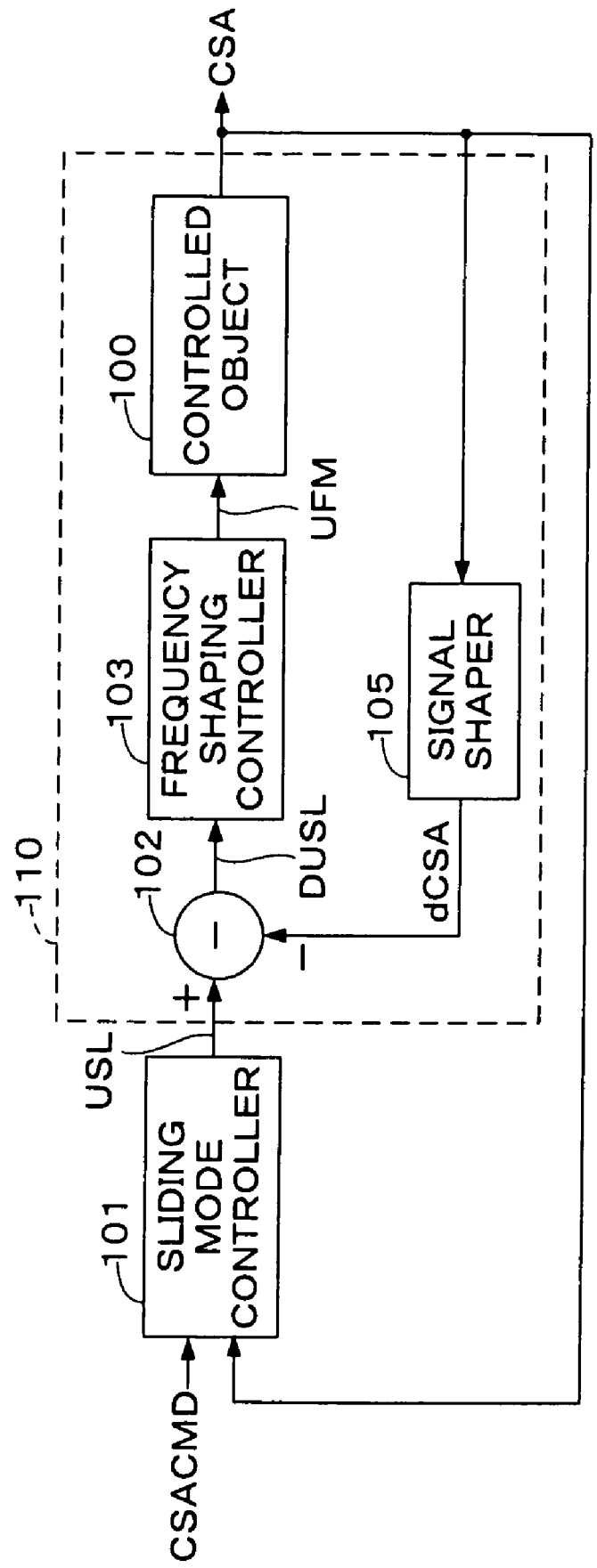
FIG. 14 is a block diagram showing a configuration of a control system according to a fourth embodiment of the present invention.

FIG. 14 is a block diagram showing a configuration of a control system in this embodiment. The control system shown in FIG. 14 is obtained by adding a signal shaper 105 to the control system shown in FIG. 5. The signal shaper 105 performs a calculation of a transfer function K(s) with respect to the CS angle CSA, to output a shaped parameter dCSA. The transfer function K(s) is set, for example, to a function "s" which corresponds to a differential operation. Therefore, in this embodiment, the subtractor 102, the frequency shaping controller 103, the controlled object 100, and the signal shaper 105 constitute an extended controlled object 110.

A transfer function FX(s) of the extended controlled object 110 can be expressed by the following equation (61). Therefore, if a target transfer function is expressed by F(s), a frequency shaping transfer function H(s), which is the transfer function of the frequency shaping controller 103, is given by the following equation (62).

$$FX(s) = \frac{G(s) \cdot H(s)}{1 + G(s) \cdot H(s) \cdot K(s)} \quad (61)$$

$$H(s) = \frac{F(s)}{1 - K(s) \cdot F(s)} \cdot \frac{1}{G(s)} \quad (62)$$

With the configuration shown in FIG. 14, the transfer function of the extended controlled object 110 can be made to be the target transfer function F(s). Accordingly, influence of the error factors such as a change in the dynamic characteristic of the controlled object 100, a large disturbance, or nonlinear elements in the control system, can be removed with the feedback control performed by the signal shaper 105, the subtractor 102, and the frequency shaping controller 103, even if there exists any of such error factors in the control system. Consequently, a stable control with the sliding mode controller 101 can be performed.

The control system of the first embodiment shown in FIG. 5 corresponds to a system wherein the transfer function K(s) of the signal shaper 105 in this embodiment is set to "1".

In this embodiment, the signal shaper 105, the subtractor 102, and the frequency shaping controller 103 correspond to the transfer characteristic adjusting means.

Fifth Embodiment

In this embodiment, the disturbance observer 104 in the second embodiment is configured as shown in FIG. 15A. The sliding mode controller 101 and the controlled object 100 are the same as those of the second embodiment.

In this embodiment, a high pass filter 125 (hereinafter referred to as "HPF") is inserted, as shown in FIG. 15A, between the subtractor 122 and the subtractor 124. The subtractor 122 inputs the disturbance estimated value DHAT to the HPF 125. The HPF 125 performs the high pass filtering of the disturbance estimated value DHAT, and inputs a filtered disturbance estimated value DHATF to the subtractor 124. The subtractor 124 subtracts the filtered disturbance estimated value DHATF from the feedback control input USL, to calculate the final control input UFM.

FIG. 16 shows a gain frequency characteristic which is obtained by combining a gain frequency characteristic of the HPF 125 with a gain frequency characteristic of the LPFs 121 and 123. The region P11 shown in FIG. 16 indicates a cutoff characteristic of the HPF 125, and the region P12 indicates a cutoff characteristic of the LPFs 121 and 123.

The characteristic shown in FIG. 16 indicates a band-pass filtering characteristic. The configuration shown in FIG. 15A is equivalent to the configuration shown in FIG. 15B. That is, the control system may be configured by deleting the LPFs 121 and 123, and replacing the HPF 125 with a band-pass filter 126 (hereinafter referred to as "BPF"). In such system, the gain frequency characteristic of the BPF 126 is set as shown in FIG. 16.

Next, a transfer characteristic of the disturbance observer shown in FIG. 15A will be described.

If a transfer function QH(s) of the HPF 125 is given by the following equation (71), a transfer function QH(z) of the discrete time system is expressed by the following equation (72). In the equation (71), $\tau_h$ is a constant, and coefficients c1, d0, and d1 which are contained in the equation (72) can be calculated with the well-known method using the constant $\tau_h$ and the control period T.

$$QH(s) = \frac{\tau_h \cdot s}{\tau_h \cdot s + 1} \quad (71)$$

$$QH(z) = \frac{d0 \cdot z + d1}{z - c1} \quad (72)$$

Accordingly, a filtered disturbance estimated value DHATF(k) is given by the following equation (73). In the equation (73), DHAT(k) is given by the above-described equation (56).

$$DHATF(k) = \quad (73)$$
$$c1 \times DHATF(k-1) + d0 \times DHAT(k) + d1 \times DHAT(k-1)$$

Therefore, the final control input UFM(k) is given by the following equation (74).

$$UFM(k) = USL(k) - DHATF(k) \quad (74)$$

Figure 17A:
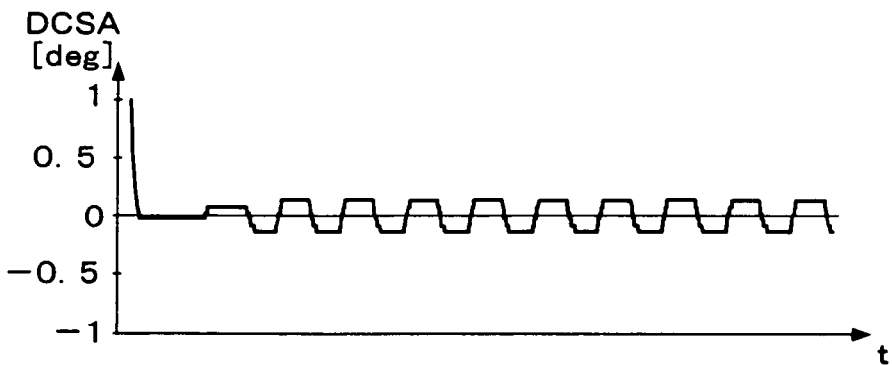
FIGS. 17A and 17B are time charts showing an example of the control operation.
Figure 17B:
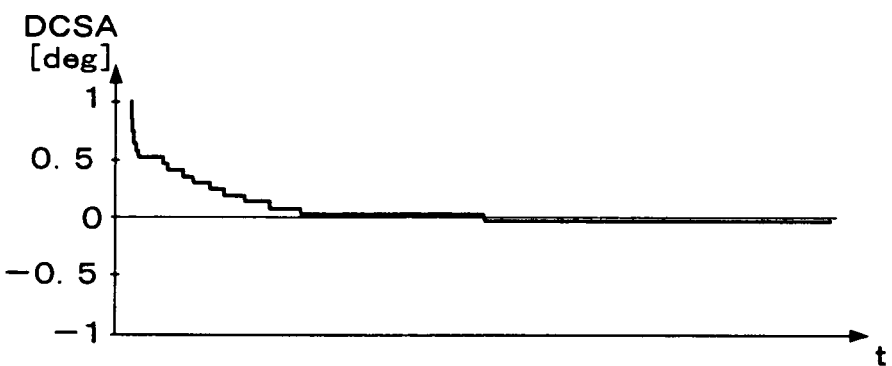

FIG. 17A shows changes in the control deviation DCSA when increasing the amplitude of the error factor in the second embodiment. The control deviation DCSA vibrates with a very small amplitude in a frequency of about 1 Hz. FIG. 17B shows the control deviation DCSA in this embodiment when applying the error factor of the same amplitude. It is confirmed that the vibration shown in FIG. 17A has been removed.

In this embodiment as described above, the filtered disturbance estimated value DHATF is calculated by using the HPF 125 in addition to the LPFs 121 and 123, and the final control input UFM is calculated by subtracting the filtered disturbance estimated value DHATF from the feedback control input USL. Accordingly, the small vibration in the control deviation DCSA can be removed, which improves accuracy of the feedback control. In addition, it is preferable to set the cutoff frequency of the HPF 125 (the cutoff frequency on the low frequency side of the BPF 126) according to the frequency of the oscillating component which appears in the CS angle CSA. (the controlled output of the plant).

In this embodiment, the LPFs 121, 123 and the HPF 125, or the BPF 126 constitute(s) the filtering means.

It is to be noted that the disturbance observer 104 in the fourth embodiment may be configured as shown in FIG. 15A or FIG. 15B.

Sixth Embodiment

Figure 18:
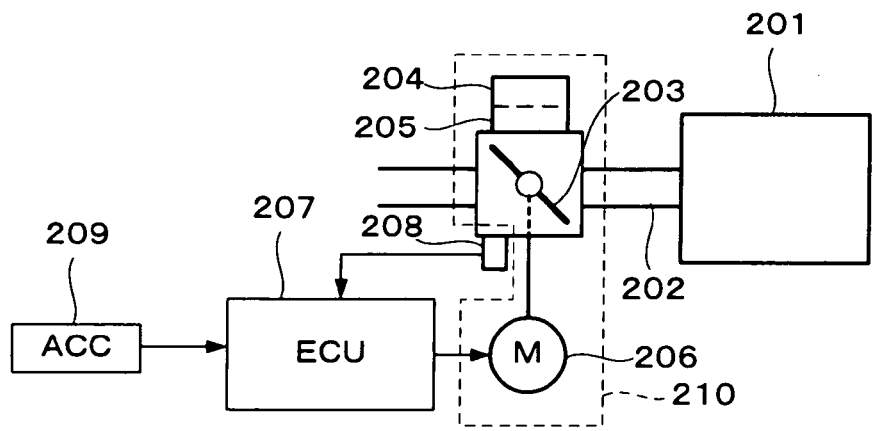
FIG. 18 is a block diagram showing a configuration of a control system according to a sixth embodiment of the present invention.

In this embodiment, the present invention can be applied to a control of a throttle valve actuating device. The throttle valve actuating device and a control system therefore are configured as shown in FIG. 18, for example.

A throttle valve 203 is provided in an intake passage 202 of an engine 201. A return spring 204 for biasing the throttle valve 203 in the closing direction, and a resilient member 205 for biasing the throttle valve 203 in the opening direction are mounted on the throttle valve 203. The throttle valve 203 is configured so as to be actuated by a motor 206 via a gear mechanism (not shown). In a state where a driving force by the motor 206 is not applied to the throttle valve 203, the opening TH of the throttle valve 203 is held at a default opening THDEF (for example, 5 degrees) where a biasing force of the return spring 204 and a biasing force of the resilient member 205 are balanced. The throttle valve 203, the return spring 204, the resilient member 205, the motor 206, and the gear mechanism (not shown) constitute the throttle valve actuating device 210 which is a controlled object.

The motor 206 is connected to an ECU 207 and the operation of the motor 206 is controlled by the ECU 207. The throttle valve 203 is provided a throttle valve opening sensor 208 for detecting a throttle valve opening TH, and the detection signal is supplied to the ECU 207.

The ECU 207 is connected to an accelerator sensor 209 for detecting a depression amount ACC of an accelerator pedal indicative of an demand output of the driver of the vehicle on which the engine 201 is mounted. The detection signal of the accelerator sensor 209 is supplied to the ECU 207.

The ECU 207 can include an input circuit, a CPU, a memory circuit, an output circuit, and the like, similarly to the ECU 5 in the first embodiment. The ECU 207 calculates a target opening THR of the throttle valve 203 according to the depression amount ACC of the accelerator pedal, and calculates an control input DUT to the motor 206 so that the detected throttle valve opening TH coincides with the target opening THR. The ECU 207 supplies an electrical signal according to the control input DUT to the motor 206.

A transfer function G2(s) of the throttle valve actuating device 210, which is a controlled object in the control system described above (more properly, a transfer function of the controlled object model obtained by modeling the throttle valve actuating device), can be expressed by the transfer function of a second-order delay system like the transfer function G(s) in the first embodiment. Accordingly, each configuration of the control systems shown in the first to fifth embodiments can be applied in this embodiment, thereby performing the control of making the throttle valve opening TH coincide with the target opening THR (the throttle valve opening TH corresponds to the CS angle CSA, and the target opening THR corresponds to the CS angle command value. CSACMD).

Seventh Embodiment

Figure 19:
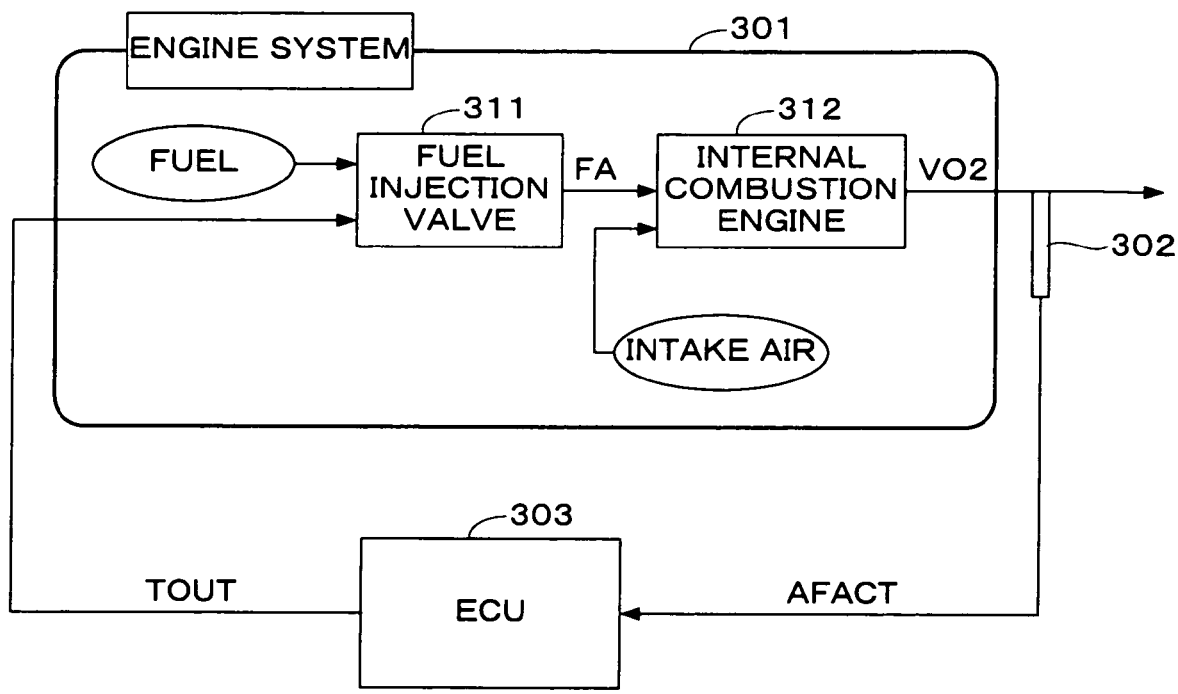
FIG. 19 is a block diagram showing a configuration of a control system according to a seventh embodiment of the present invention.

In this embodiment, the present invention is applied to an air-fuel ratio control for an internal combustion engine. FIG. 19 is a block diagram showing a configuration of a control system for the air-fuel ratio control. The control system can include an engine system 301, an air-fuel ratio sensor 302, and an ECU 303. The engine system 301 is a controlled object including an engine 312. The air-fuel ratio sensor 302 detects an air-fuel ratio of an air-fuel mixture supplied to the engine 312 according to an oxygen concentration VO2 in exhaust gases of the engine system 301. The ECU 303 calculates a fuel injection period TOUT so that an air-fuel ratio sensor output AFACT coincides with a target air-fuel ratio AFCMD. The ECU 303 can include an input circuit, a CPU, a memory circuit, an output circuit, and the like, similarly to the ECU 5 in the first embodiment.

The engine system 301 can include a fuel injection valve 311 and an engine 312. The fuel injection valve 311 injects fuel according to the fuel injection period TOUT and the engine 312 burns air-fuel mixture which consists of fuel supplied through the fuel injection valve 311 and intake air. The engine system 301 burns fuel, outputs a rotation torque, and discharges combustion gases (exhaust gases).

A transfer function G3(s) of the engine system 301, which is a controlled object in the control system described above (more properly, a transfer function of the controlled object model obtained by modeling the engine system), can be expressed by the transfer function of the second-order delay system like the transfer function G(s) in the first embodiment. Accordingly, each configuration of the control systems shown in the first to fifth embodiments can be applied in this embodiment, thereby performing the control of making the detected air-fuel ratio AFACT coincide with the target air-fuel ratio AFCMD (the detected air-fuel ratio AFACT corresponds to the CS angle CSA, and the target air-fuel ratio AFCMD corresponds to the CS angle command value CSACMD).

The present invention is not limited to the embodiments described above, and various modifications may be made. For example, in the above-described embodiments, the controlled objects whose transfer function corresponds to the second-order delay system are shown. The present invention is applicable regardless of the transfer function of the controlled object. This is clear from the descriptions of the first and second embodiments. Further, with respect to the target transfer function F(s), the examples where the transfer function F(s) is set to a transfer function corresponding to the second-order delay system, are shown in the above-described embodiments. Alternatively, the target transfer function F(s) can be set to any desired transfer function other than the transfer function corresponding to the second-order delay system, which is apparent from the descriptions of the first and second embodiments.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for a plant, comprising:
sliding mode control means for calculating a feedback control input with a sliding mode control so that a controlled output of said plant coincides with a target value; and
transfer characteristic adjusting means which is connected to an output of said sliding mode control means, and has a transfer characteristic set according to a transfer function of a controlled object model which is obtained by modeling said plant,
wherein a control input to said plant is set to an output of said transfer characteristic adjusting means, and
the transfer characteristic of said transfer characteristic adjusting means is set so that a composite transfer function indicative of a transfer characteristic which is obtained by combining the transfer characteristic of said transfer characteristic adjusting means and a transfer characteristic of said controlled object model, coincides with a desired target transfer function, wherein said transfer characteristic adjusting means includes a subtractor and a frequency shaping controller, said subtractor calculates a difference between the feedback control input and the controlled output of said plant, and said frequency shaping controller calculates the control input to said plant by applying a frequency shaping transfer function to the calculated difference.

2. A control system according to claim 1, wherein said transfer characteristic adjusting means includes disturbance estimating means for estimating a disturbance component applied to said plant according to the control input to said plant and the controlled output of said plant, and calculates the control input to said plant by subtracting the disturbance component output from said disturbance estimating means, from the feedback control input.

3. A control system according to claim 1, wherein said transfer characteristic adjusting means includes a subtractor, a frequency shaping controller, and disturbance estimating means, said subtractor calculates a difference between the feedback control input and the controlled output of said plant, said frequency shaping controller calculates a frequency shaped output by applying a frequency shaping transfer function to the calculated difference, said disturbance estimating means estimates a disturbance component applied to said plant according to the control input to said plant and the controlled output of said plant, and said transfer characteristic adjusting means calculates the control input to said plant by subtracting the disturbance component estimated by said disturbance estimating means from the frequency shaped output.

4. A control system according to claim 2, wherein said disturbance estimating means includes filtering means for performing a band-pass filtering of the disturbance component estimated according to the control input to said plant and the controlled output of said plant, and outputs the disturbance component filtered by said filtering means.

5. A control method for a plant, comprising:
a) calculating a feedback control input with a sliding mode control so that a controlled output of a plant coincides with a target value;

b) inputting the calculated feedback control input to a transfer characteristic adjusting module which has a transfer characteristic set according to a transfer function of a controlled object model which is obtained by modeling said plant; and c) inputting the output of said transfer characteristic adjusting module as a control input to said plant, wherein the transfer characteristic of said transfer characteristic adjusting module is set so that a composite transfer function indicative of a transfer characteristic which is obtained by combining the transfer characteristic of said transfer characteristic adjusting module and a transfer characteristic of said controlled object model, coincides with a desired target transfer function, wherein said transfer characteristic adjusting module calculates a difference between the feedback control input and the controlled output of said plant, and calculates the control input to said plant by applying a frequency shaping transfer function to the calculated difference.

6. A control method according to claim 5, wherein said transfer characteristic adjusting module estimates a disturbance component applied to said plant according to the control input to said plant and the controlled output of said plant, and calculates the control input to said plant by subtracting the disturbance component from the feedback control input.

7. A control method according to claim 5, wherein said transfer characteristic adjusting module calculates a difference between the feedback control input and the controlled output of said plant; calculates a frequency shaped output by applying a frequency shaping transfer function to the calculated difference; estimates a disturbance component applied to said plant according to the control input to said plant and the controlled output of said plant; and calculates the control input to said plant by subtracting the estimated disturbance component from the frequency shaped output.

8. A control method according to claim 6, wherein said transfer characteristic adjusting module performs a band-pass filtering of the disturbance component estimated according to the control input to said plant and the controlled output of said plant, to calculate a filtered disturbance component, and uses the filtered disturbance component for calculating the control input to said plant.

9. An apparatus, comprising:
a sliding mode controller configured to calculate a feedback control input with a sliding mode control, wherein a controlled output of a plant coincides with a target value;

a transfer characteristic controller connected to an output of the sliding mode controller, wherein a transfer characteristic is set according to a transfer function of a controlled object model which is obtained by modeling the plant, wherein a control input to the plant is configured to be set to an output of the transfer characteristic adjuster, and wherein the transfer characteristic of the transfer characteristic adjuster is set so that a composite transfer function indicative of a transfer characteristic which is obtained by combining the transfer characteristic of the transfer characteristic adjuster and a transfer characteristic of the controlled object model, coincides with a desired transfer function, wherein said transfer characteristic adjuster includes a subtractor and a frequency shaping controller, wherein the subtractor is configured to calculate a difference between the feedback controlled input and the controlled output of the plant, and wherein the frequency shaping controller is also configured to calculate the control input to the plant by applying a frequency shaping transfer function to the calculated difference.

10. An apparatus according to claim 9, wherein the transfer characteristic adjuster includes a disturbance estimator which is configured to estimate a disturbance component applied to the plant according to the control input to the plant and the controlled output of the plant, and is also configured to calculate the control input to the plant by subtracting the disturbance component output from the disturbance estimator, from the feedback control input.

11. An apparatus according to claim 9, wherein the transfer characteristic adjuster includes a subtractor, a frequency shaping controller, and a disturbance estimator, wherein the subtractor is configured to calculate a difference between the feedback controlled input and controlled output of the plant, wherein the frequency shaping controller is configured to calculate a frequency shape output by applying a frequency shaping transfer function to the calculated difference, wherein the disturbance estimator is configured to estimate a disturbance component applied to the plant according to the control input to the plant and controlled output of the plant, and wherein the transfer characteristic adjuster is configured to calculate the control input to the plant by subtracting the disturbance component estimated by the disturbance estimator from the frequency shaped output.

12. An apparatus according claim 10, wherein the disturbance estimator includes a filter which is configured to perform band-pass filtering of the disturbance component estimated according to the control input to the plant and the controlled output of the plant, and is also configured to output the disturbance component filtered by the filter.

* * * * *